(12) United States Patent
Donoghue et al.

(10) Patent No.: US 7,289,496 B2
(45) Date of Patent: Oct. 30, 2007

(54) CASCADE SYSTEM FOR NETWORK UNITS

(75) Inventors: Bryan J Donoghue, St. Albans (GB); Quang T Tran, Wokingham (GB); Eugene O'Neill, Dublin (IE); David J Law, Edinburgh (GB); Paul J Moran, Hemel Hempstead (GB); Edele O'Malley, Dublin (IE); Jerome Nolan, Dublin (IE); Kam Choi, Tring (GB); Maurice A Goodfellow, Dunstable (GB)

(73) Assignee: 3Com Corporation, Marlborough, MA (US)

( * ) Notice: Subject to any disclaimer, the term of this patent is extended or adjusted under 35 U.S.C. 154(b) by 932 days.

(21) Appl. No.: 10/067,738

(22) Filed: Feb. 8, 2002

(65) Prior Publication Data

US 2003/0118021 A1    Jun. 26, 2003

(30) Foreign Application Priority Data

Dec. 22, 2001 (GB) ................................. 0130798.2

(51) Int. Cl.
*H04L 12/50* (2006.01)
(52) U.S. Cl. ....................... 370/386; 370/218; 370/220
(58) Field of Classification Search ..................... None
See application file for complete search history.

(56) References Cited

U.S. PATENT DOCUMENTS

| | | | |
|---|---|---|---|
| 5,341,374 A | | 8/1994 | Lewen et al. |
| 5,623,482 A | | 4/1997 | Okanoue |
| 5,938,736 A | * | 8/1999 | Muller et al. ................ 709/243 |

(Continued)

FOREIGN PATENT DOCUMENTS

DE    19704021 A1    5/1998

(Continued)

OTHER PUBLICATIONS

Schultze, "Fault-Tolerance in Real-time Communication", Industrial Electronics, 1993, Conference Proceedings, ISIE '93—Budapest, IEEE International Symposium on Budapest, Hungary Jun. 1-3, 1993, pp. 583-587, XP010068588.

(Continued)

*Primary Examiner*—Bob A. Phunkulh

(57) ABSTRACT

Network units such as switches for use in a cascaded stack are organised to provide a cascade connection in the form of a dual unidirectional connection so that, in its ordinary configuration, there is at least one and preferably more than one unidirectional ring for each direction around the cascade, each ring including a respective port on each unit. For each ring, each port on a unit is connected by a respective link to a corresponding port on the preceding unit and the following unit. The units provide a self-healing operation in the event of various kinds of operational failure. The self-healing operation includes loop-back of packets in units adjacent the failure and bypass of a packet switching process for other units. The units include control logic for passing control frames containing status information relating to the units and links between them and for co-operation with a CPU to control a switching engine to perform the self-healing operation in accordance with that status information. The units forward on the cascade packets with headers that identify a destination port and the unit on which that port is located and also indicate which units have and have not been traversed by a packet.

12 Claims, 14 Drawing Sheets

U.S. PATENT DOCUMENTS

| | | |
|---|---|---|
| 6,282,201 B1 | 8/2001 | Alexander, Jr. et al. |
| 6,373,840 B1 | 4/2002 | Chen |
| 6,490,276 B1 * | 12/2002 | Salett et al. ............... 370/360 |
| 6,496,502 B1 * | 12/2002 | Fite et al. .................. 370/389 |
| 6,546,010 B1 * | 4/2003 | Merchant et al. ........... 370/389 |
| 6,891,843 B1 * | 5/2005 | Sang et al. ................. 370/406 |

FOREIGN PATENT DOCUMENTS

| | | |
|---|---|---|
| DE | 19945840 A1 | 4/2001 |
| EP | 0408138 A1 | 1/1991 |
| EP | 0854611 A2 | 7/1998 |
| EP | 0912944 B1 | 11/2000 |
| FR | 2794918 A1 | 12/2000 |
| GB | 2327020 A | 1/1999 |
| GB | 2349781 B | 11/2000 |
| GB | 2350032 A | 11/2000 |
| GB | 2357390 A | 6/2001 |
| GB | 2361830 A | 10/2001 |
| GB | 2362538 A | 11/2001 |
| GB | 2365718 A | 2/2002 |
| GB | 2368748 A | 5/2002 |
| JP | 080008947 A | 1/1996 |
| WO | WO92/04787 | 3/1992 |
| WO | WO 00/72533 A1 | 11/2000 |

OTHER PUBLICATIONS

Schnell, "Bussysteme in der Automatisierungstechnik" 1996, Vieweg, Braunschweig/Wiesbaden, XP002236127, pp. 111-116.

* cited by examiner

```
always @(posedge clk or negedge reset)
begin
  if (reset) begin
    my_regs_UNIT_ID <= 0;
    my_regs_MISCONFIG_REQ <= FALSE;
    my_regs_RENUM_REQ <= FALSE;
  end
  else begin
    my_regs_UNIT_ID <= my_regs_UNIT_ID;
    my_regs_MISCONFIG_REQ <= FALSE;
    my_regs_RENUM_REQ <= FALSE;

if (PRIMARY) begin
      if (RESILENT)
        my_regs_UNIT_ID <= 0;
    end
    else begin
      if (!down_regs_IDLE) begin
        if (down_regs_UNIT_ID==3 &&
    down_regs_NEXT_CTRL==4'b1111)
          my_regs_MISCONFIG_REQ <= TRUE;
        else if (down_regs_UNIT_ID == 3)
          my_regs_RENUM_REQ <= TRUE;
        else
          my_regs_UNIT_ID <= down_regs_UNIT_ID + 1;
        end
      end
    end
  end
end always
begin          // generate UNIT_ID from NEXT_CTRL
  casex (down_regs_NEXT_CTRL)
    4'b1xxx: down_regs_UNIT_ID = 3;
    4'b01xx: down_regs_UNIT_ID = 2;
    4'b001x: down_regs_UNIT_ID = 1;
    default: down_regs_UNIT_ID = 0;
  endcase
end
```

FIG. 13

```
always @(posedge clk or negedge reset)
begin
  if (reset) begin
    my_regs_CURRENT_POWER <= 4'b0000;
    my_regs_NEXT_POWER    <= 4'b0000;
    my_regs_CURRENT_CTRL  <= 4'b0000;
    my_regs_NEXT_CTRL     <= 4'b0000;
  end
  else begin
    if (!down_regs_IDLE) begin
      if (PRIMARY) begin
        my_regs_CURRENT_POWER <=
        down_regs_NEXT_POWER;
        my_regs_NEXT_POWER    <= MY_POWER <<
        my_regs_UNIT_ID;
        // MY_POWER is a sample of the input
        Unit_Power_Sense
        my_regs_CURRENT_CTRL <=
        down_regs_NEXT_CTRL;
        my_regs_NEXT_CTRL <= 1'b1 <<
        my_regs_UNIT_ID;
      end
      else begin
          my_regs_CURRENT_POWER <=
down_regs_CURRENT_POWER;
        my_regs_NEXT_POWER <=
        down_regs_NEXT_POWER | (MY_POWER <<
        my_regs_UNIT_ID);
        my_regs_CURRENT_CTRL <=
        down_regs_CURRENT_CTRL;
        my_regs_NEXT_CTRL <=
        down_regs_NEXT_CTRL | (1'b1 <<
        my_regs_UNIT_ID);
      end
    end
    else begin
      // leave registers unchanged
    end
  end
end
```

| | 7 | 6 | 5 | 4 | 3 | 2 | 1 | 0 |
|---|---|---|---|---|---|---|---|---|
| Byte 3 | CURRENT_POWER[3:0] | | | | NEXT_POWER[3:0] | | | |
| Byte 2 | CURRENT_CTRL[3:0] | | | | NEXT_CTRL[3:0] | | | |
| Byte 1 | Reserved | | MISCONFIG_REQ | MISCONFIG | RENUM_REQ | RENUM | HEAL_REQ | HEAL |
| Byte 0 | Reserved | | | | | | | IDLE |

FIG. 16

| | 7 | 6 | 5 | 4 | 3 | 2 | 1 | 0 |
|---|---|---|---|---|---|---|---|---|
| Byte 4 | ACTIVE_FRAMES | MY_POWER | RESILIENT | PRIMARY | CTRL_OK_UP | CTRL_OK_DOWN | UNIT_ID[1:0] | |
| Byte 3 | CURRENT_POWER[3:0] | | | | NEXT_POWER[3:0] | | | |
| Byte 2 | CURRENT_CTRL[3:0] | | | | NEXT_CTRL[3:0] | | | |
| Byte 1 | Reserved | | MISCONFIG_REQ | MISCONFIG | RENUM_REQ | RENUM | HEAL_REQ | HEAL |
| Byte 0 | Reserved | | | | | | | IDLE |

|  | CURRENT_POWER | CURRENT_CTRL | HEAL | CTRL_OK_UP | CTRL_OK_DOWN |
|---|---|---|---|---|---|
| Unit-3 | 1111 | 1111 | 0 | 1 | 1 |
| Unit-2 | 1111 | 1111 | 0 | 1 | 1 |
| Unit-1 | 1111 | 1111 | 0 | 1 | 1 |
| Unit-0 | 1111 | 1111 | 0 | 1 | 1 |

CCL Register Fields in Normal Mode

FIG. 19

|  | CURRENT_POWER | CURRENT_CTRL | HEAL | CTRL_OK_UP | CTRL_OK_DOWN |
|---|---|---|---|---|---|
| Unit-3 | 1011 | 1111 | 0 | 1 | 1 |
| Unit-2 | 1011 | 1111 | 0 | 1 | 1 |
| Unit-1 | 1011 | 1111 | 0 | 1 | 1 |
| Unit-0 | 1011 | 1111 | 0 | 1 | 1 |

CCL Register Fields in Healed Mode

FIG. 20

|  | CURRENT_POWER | CURRENT_CTRL | HEAL | CTRL_OK_UP | CTRL_OK_DOWN |
|---|---|---|---|---|---|
| Unit-3 | 1111 | 1111 | 1 | 1 | 1 |
| Unit-2 | 1111 | 1111 | 1 | 1 | 0 |
| Unit-1 | 1111 | 1111 | 1 | 0 | 1 |
| Unit-0 | 1111 | 1111 | 1 | 1 | 1 |

CCL Register Fields in Healed Mode (due to missing cable)

FIG. 21

CASCADE SYSTEM FOR NETWORK UNITS

CROSS-REFERENCE TO RELATED APPLICATION

Donoghue et al, entitled 'Cascade Control System for Network Units' filed on the same day as the present application and commonly assigned herewith.

FIELD OF THE INVENTION

This invention relates to packet-switched communication networks. More particularly the invention relates to networks compatible with 'Ethernet' transmission formats and protocols. The invention specifically concerns what is known as the 'cascading' of switches or other units in or for such a network. Various aspects of the invention concern the logical management, control and signal formats preferably incorporated in a cascade.

BACKGROUND TO THE INVENTION

The physical elements in a packet-based data communication system commonly include multi-port units such as switches and routers. Such units are commonly and conveniently manufactured with a fixed plurality of ports by means of which the units can be connected by way of appropriate transmission links (such as cables or optical fibres) to other units or user terminals. In order to provide greater versatility in constructing networks while minimising the number of different sizes of units that need to be deployed it is known from EP-0912944 and also various switches, such as the Super Stack 3 Switch 3300 made by 3Com Corporation, to render the units 'stackable' by which is meant that a multiplicity of them can be interconnected to form effectively a single controllabe entity. It is customary to make such units physically stackable in a column although this physical aspect of the term is not essential to the meaning of 'stackable' or to the present invention.

In order to provide intercommunication between the units, so that for example packets received at any of the ordinary ports (commonly termed 'front panel' ports) can be forwarded from a port or ports on another unit or units, depending on the addressing of the packets and the nature of them, it is customary to connect stacked units together by means of a cascade, which is the term used for the communication links and associated control functions by means of which packets are transmitted between the units in the stack.

The design and organisation of a cascade are attended by some considerable complexity. For example, the forwarding of packets on the cascade has to be controlled according to a variety of rules which are intended to conform, for each particular unit, to the forwarding rules relevant for different types of packet, such as unicast, broadcast and multicast, as well as other relevant rules such as those relating to bridging. The rules may need to be preserved or modified to make the operation of the cascade more convenient or more versatile. Furthermore, as will be more particularly appreciated hereinafter, it is desirable to employ a packet format which accommodates information particular to the operation of the cascade. One example among many, is, as described in GB-2359692, the modification of packets to enable them to obey proper forwarding rules when ports on some but not necessarily all the units are members of a trunk, namely a multi-link connection from those ports to another unit or stack of units.

An added difficulty arises when it is desired to form a cascade connection of units such that the connection can accommodate the addition of units into the cascade or the removal of units from the cascade or even the failure of one or more units in the cascade or failure or removal of links (such as cables) between units without requiring manual adaptation or reconfiguration and which allows the augmented or diminished or partially defective cascade to continue operation after only a momentary delay. The terms 'hot-swap' or 'hot insertion' are conveniently used to refer to the exchange or insertion of units which allows the cascade connection to function immediately after the swapping or insertion process takes place. The term 'self-healing' may be used to indicate the nature of a cascade which can, despite the failure of a unit or link, continue to function in respect of the other units in the cascade.

It is known from published GB patent application No. 2357390 to provide a limited form of self-healing, employing a single bidirectional cascade which car, revert to a unidirectional cascade if a link or unit fails. That earlier proposal requires in its described form complex forwarding rules which are not easy to accommodate with other forwarding rules that the units may need to observe. The proposal does not indicate how hot insertion or hot swapping may be achieved in practice.

In the 3Ccm switch type 4400 a cascade data path and a cascade control path can be maintained irrespective of the operational state of the network units in a stack by means of three-port connectors (known as T-pieces). These connectors have internal hardware processing circuits coupled to a 'Down' port, an 'Up' port and a module port which is connected to a respective unit. The processing circuits can compute and convey identification numbering (i.e. 'Unit-IDs') and an active unit count by means of control frames sent and received at each of the three ports.

However, these circuits and the associated multiplexing impose a considerable hardware processing overhead which increases (owing to the need for active clock and data recovery) with higher bit rates.

SUMMARY OF THE INVENTION

There are broadly three aspects to the achievement of a self-healing cascade which allows hot insertion or hot-swap. One is the organisation of the data path so that it can accommodate insertion, removal or failure of units or links. A second aspect is the use of special headers so that packets on the data path can convey not only the ordinary address information characteristic of Ethernet packets as well as the payload (message data) and other parts of an Ethernet packet, but can also convey, within the system of the cascade, information which enables the switching engines of the units to operate as a single unit. A third aspect is the organisation and design of a control path by means of which information relating to the status or relative configuration of the units can be conveyed and automatically adjusted when units are added or subtracted operationally from the cascade.

The present invention is particularly directed to the first two of these aspects. The third aspect, the control path, is a desirable feature of a system according to the present invention but has an independent utility and is the subject of the above-mentioned co-pending application entitled 'Cascade (control System for Network Units'.

As indicated previously, the main object of the present invention is to facilitate the provision of a self-healing hot-swappable cascade connection. Features of the invention include not only the physical and logical organisation of the cascade connection but also the organisation of a unit, so that it can obey the rules prescribed by the preferred organisation of the cascade connection, and a preferred signal format for use on the cascade.

A preferred embodiment of the present invention is based on the provision of a cascade connection in the form of a dual unidirectional connection so that, in its ordinary configuration, there is at least one and preferably more than one unidirectional ring for each direction around the cascade, each ring including a respective port on each unit. For each ring, each port on a unit would be connected by a respective link to a corresponding port on the preceding unit and the following unit.

The basis of this configuration is that in the event of a cascade operational failure (e.g. failure or removal of a unit or cable), the units on each side of the failure can maintain a cascade connection. A further object of the present invention is to provide mechanisms for such a healing process.

The preferred form of the invention provides the aforementioned healing by causing the switching engines of the units immediately adjacent an operational failure in the stack to loop-back packets in one ring direction to egress the unit in the opposite ring direction. For the purpose the switching engines preferably coordinate information included in packet headers with status information which may be conveyed by control frames.

As will become apparent, each unit has at least two ports via which packets are forwarded onto the cascade and some means (such as address hashing) will be employed to provide an even distribution of forwarded packets among the ports. In order to avoid the possibility of endless loops by virtue of the combination of hashing and the action of the switching engines of units that perform loop-back, a unit which is not performing loop-back performs in respect of some cascade ports a bypass operation in which packets received at a cascade port are sent out of the same port without being subject to the normal packet switching process.

One aspect of the invention is the use of headers of packets sent on the cascade to assist the operation of the cascade.

A feature of the invention is the provision of a stack-wide port identification system, wherein a unique port ID comprises a portion (such as a six-bit binary number) identifying a port within a unit and a portion (such as a two-bit binary number) identifying a unit. Accordingly when addresses are 'learned' by the units (i.e. made the subject of entries in the look-up database) they may be learned against a port identification which identifies both a unit and a port within that unit. The use of a stack-wide identification scheme enables the source unit (i.e. the unit which first puts a packet onto the cascade connection) to perform a complete look-up (if this is possible) of the forwarding data for a packet.

Another feature of the invention is the use of a header segment, preferably in the form of a bit mask, which identifies those units which a given packet has traversed. This provides a means of discarding packets which have traversed every unit.

As indicated above, the invention may be used in conjunction with an improved control path which comprises a virtual dual-ring path constituted by a single ring of half-duplex links across which control messages are repeatedly sent. Such a path can be 'healed' into a single virtual ring by sensing whether active valid control frames exist on a link and causing loop-back of control frames within a unit in the absence of such frames. The control data may include information such as the identity of a unit, a list of units physically present in the cascade and also a list (which may be different) of active units in the cascade.

A further object of the present invention is to enable the cascade to be formed by means of links, such as cables, coupled between the cascade ports of the units in the cascade and being adapted preferably to convey the control signals employed in the preferred embodiment of the invention. More particularly it is an object of the invention to achieve this without requiring special multiplexer connectors, such a T-pieces, which would plug into special modules or ports on the units and which are organised to maintain a cascade path notwithstanding the failure or non-operational state of a unit to which a T-piece connector is coupled.

Further features of the invention will become apparent from the following description and the accompanying drawings.

BRIEF DESCRIPTION OF THE DRAWINGS

FIG. 13 illustrates an algorithm for unit identification numbers.

FIG. 14 illustrates an algorithm for the control logic.

FIG. 15 illustrates a register format.

FIG. 16 illustrates another register format.

FIG. 19 illustrates various register fields in a normal mode of operation.

FIG. 20 illustrates various register fields in a healed mode of operation.

FIG. 21 illustrates various register fields in another healed mode of operation.

DETAILED DESCRIPTION (a) General Description of a Switch

The reader is presumed to be generally familiar with the design construction and operation of network switches and routers intended for the handling and processing of address data packets, particularly according to Ethernet formats and protocols and procedures in accordance, for example, with IEEE Standard 802.3 dated December 1998. However, for the sake of completeness, a brief and deliberately simplified review of a network switch is given hereinafter for the sake of convenience. A more detailed description of the features of the switch relevant to the present invention will be given with reference to FIG. 18.

Figure 1:
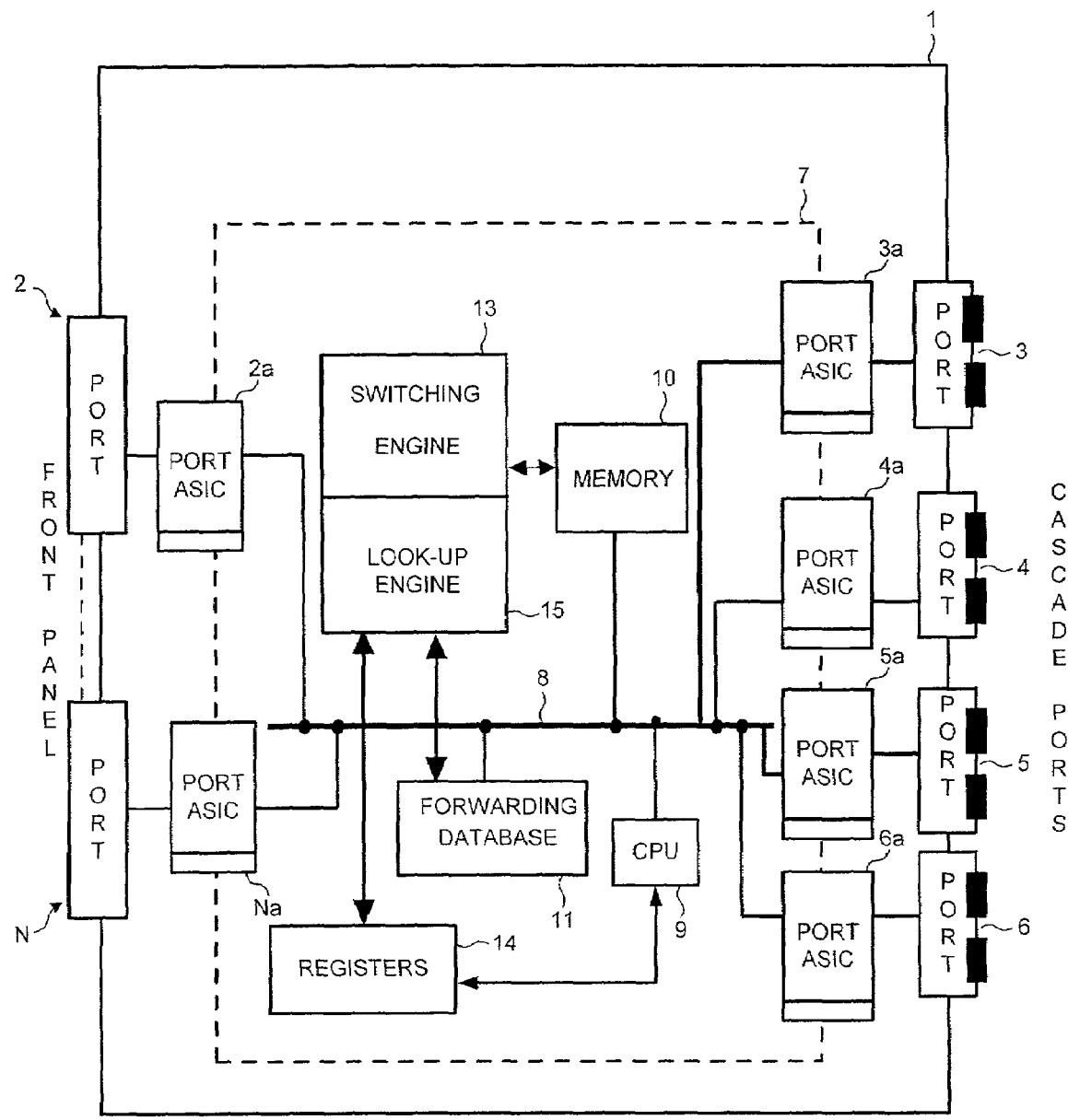
FIG. 1 illustrates schematically a switch for use in the invention.

The switch 1 shown in FIG. 1 comprises a multiplicity of ordinary or 'front panel' ports represented in the Figure by ports 2 to N. Very typically there would be twelve or perhaps twenty-four of these front panel ports, which are selectively connected to other devices such as hubs, switches, user terminals and suchlike typical of a communication network.

The switch shown in FIG. 1 also has four 'cascade' ports which will be connected in a cascade connection according to the invention.

Associated with each port is a 'port ASIC' (2a-6a and Na) which provides, typically, for buffering of packets received at the respective port or to be forwarded (depending on whether it is forwarding or receiving a packet) from the port. The port ASIC typically performs some preliminary or final processing of a packet. The ports are usually capable of standard procedures such as 'auto-negotiation', by means of which the port can establish whether the device at the far end of the link to which the port is connected is active and whether it has a transmission capability compatible with the respective port.

Although the port ASICs are shown as discrete in the Figure, in modern design practice the port ASICs together with most if not all the components of the switch may be realised in a single large ASIC, indicated by the chain lines 7. Alternatively it may be realised as described hereinafter.

FIG. 1 illustrates a system of buses 8 by means of which packet data, address data from the packets, control data and suchlike are communicated around the various components of the switch. Again, the bus system is shown in deliberately simplified form. Very typically there are separate bus paths for the various types of signals. One example of a modern switch layout is shown in Creedon et al Ser. No. 09/893,659 filed Jun. 29, 2001 and commonly assigned herewith.

Very typically, each switch has a controlling CPU 9 which governs the operation of the components of the switch. These include a packet memory 10 for the storage of packets between the times of reception and forwarding. Typically the switch includes a forwarding database 11 to which a look-up engine 12 has recourse and in accordance with which a switching engine 13 can derive from the look-up the address data and/or other associated data required for forwarding the packet to its required destination. The switch includes a multiplicity of control and status registers 14.

Normally the forwarding database stores addresses (which may be MAC addresses or network addresses) against the relevant forwarding data (i.e. port numbers). A look-up database is typically compiled by performing a look-up in respect of the source address of an incoming packet and making an entry in the database if the source address is not already held in the database.

The addresses in the database may be organised in a variety of different forms according to the search engine or engines employed. Some types of database employ hashing of address data in order to reduce long address words into shorter words for storing in a memory, though in such a case it is necessary to provide linked lists of entries which are hashed to the same address and to compare search results in turn to determine whether they correspond to the correct input data. Other forms of look-up include trie look-ups.

Different forms of forwarding database and techniques for performing look-ups are well described in for example GB patents 2337674, 2337659 and 2350534.

When a look-up is performed on a destination address, the forwarding data is retrieved and used by the switching engine 13 to direct the relevant packet to the required port or ports.

It should be well understood that if a packet is received at a 'front-panel' port of one of the units, it will be temporarily stored while a look-up based on he address data is performed. If the retrieved forwarding data indicates that the only local destination is a port on the same unit, the switching engine will direct the packet to that port. If a destination port is unknown or is known but on another unit, the packet will be forwarded onto the cascade.

The foregoing is deliberately simplified and does not include such known operations as address resolution where addresses are unknown. It does not include well known features of processing which may affect whether a packet is forwarded from any given port. These aspects are, for example, 'same port discard' rules, VLAN membership, spanning tree logic, trunking logic and suchlike. Such processing features are commonly included in the operation of a switching engine. Moreover, the foregoing description does not take into account the distribution of processing that may be adopted if, for example, the switch is composed of a multiplicity of modules connected by high-speed internal links. Reference may be made for example to earlier copending applications (commonly assigned herewith) Ser. Nos. 09/645,569 (Jennings et al.) and 09/818,670 (O'Callaghan et al) for further description of distributed processing in switches of this nature.

If a packet is received which is destined for a device not connected to the unit by which the packet was received, the packet is sent, subject to various processing requirements, to the cascade. In the switch shown in the drawing there are four 'cascade' ports. In general, a packet may be sent to any one of those ports and whichever that might be can be determined by hashing (for example by means of exclusive-OR circuits) address data in the packet to a short word, such as a two-digit word which will identify uniquely the selected port. Hashing procedures of this general nature are known from, for example, GB application 2361830 and may be included in the packet processing described above. As will be further apparent, it is necessary to include some means by which the packet will be transmitted by subsequent units in a consistent direction around the cascade.

For reasons which will soon be apparent each of the cascade ports has two 'connectors', one for the 'Up' direction and one for the 'Down' direction, so that each port can be connected to the corresponding port in the next and previous units in the cascade.

(b) Cascade Connection

Figure 2:
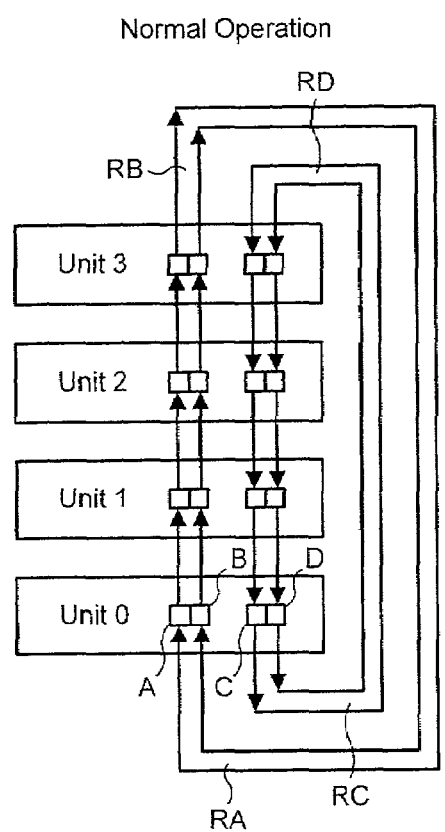
FIGS. 2 and 3 illustrate the operation of a cascade connection in accordance with the invention.

The cascade connection shown in FIG. 2 is in essence a trunk connection made up of four unidirectional rings. Unit 0 shows the four cascade ports denoted A, B, C and D from left to right. The four rings in this specific example are each capable of a transmission rate of 2.5 gigabit per second and are so connected that they connect respective ports on the various units. Thus ring RA connects the ports A on the four units and is composed of links each from the TX side of a port A to the RX side of the corresponding port A of the next unit; ring RB connects the ports B, ring RC connects the ports C and ring RD connects the ports D. The organisation is such that whereas ports A and B receive packets on the respective links from the ports A and B of the preceding unit on the cascade and forward by way of the respective link to the respective ports on he next unit on the cascade, the direction of receiving and forwarding for ports C and D is reversed.

The links between the units are each point to point connections each of which forms an individual MAC domain. As will be seen, the individual links are almost standard Ethernet links with some additional signalling to enable the cascade to function. All packets will normally be subject to the switching engine of each unit.

It should also be remarked that some means needs to be employed to ensure that where, for example, a given unit receives a packet on port A but needs to forward that packet further round the ring, that packet will be sent out on the same port A in a consistent direction. One method of achieving this is for all the units to employ the same hashing algorithm for cascade port selection on some packet segment (e.g. a network address) which will not vary as the packet progresses around the cascade.

It may also be denoted at the present stage that the cascade is preferably source-routed. When a unit receives a packet on a front-panel port it will perform a full look-up for the destination unit and port even if the packet is destined for another unit. The advantage of such a technique is that no look-up bandwidth is required for cascade port ingress. Units need to learn packet source addresses (SA) against the ingress port and unit. If look-up tables are to remain current then all the units have to update their look-up tables whenever a unit is removed from the stack. This may be achieved by way of the normal 'learning' process of the look-up databases in the various units.

(c) Cascade Path Healing

Figure 3:
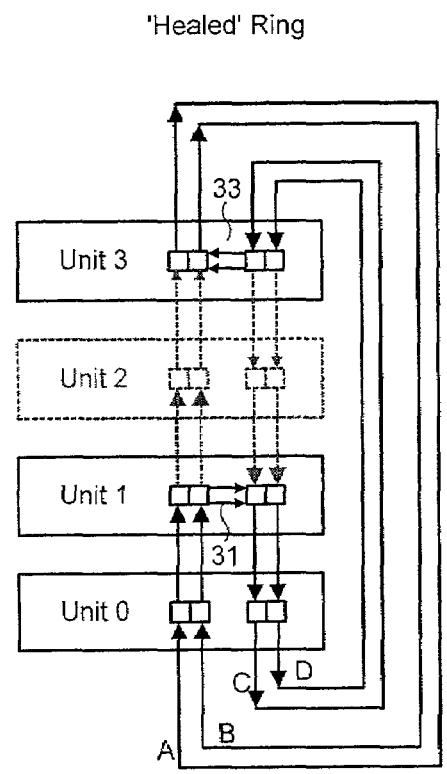

FIG. 3 illustrates a circumstance where Unit 2 has failed or is powered-down preparatory to removal. As described later, cascade control logic monitors the status of the cascade units and in particular whether there is communication on all the links in the cascade and reports the powering-down of Unit 2 to the other units on the cascade. As further described in more detail later, the switching engines, each under the control of the respective CPU, will take the following actions to heal the cascade.

Unit 3 will loop back packets from ports C and D to ports A and B. More specifically, this unit will process packets that are received on either port C or port D and retransmit those packets on ports A and B. Likewise, Unit 1 will loop back packets from ports A and B to its own ports C and D. It will process packets received on ports A and B and retransmit packets on ports C and D.

However, Unit 0 (which is not adjacent the powered-down Unit 2) will operate differently. When it receives a packet on either port A or port B then any packets destined for Unit 1 or Unit 3 will be retransmitted on those ports. Any packets received on ports C and D will be retransmitted on those ports without any processing. This action is called herein 'bypassing' and can be controlled by means of information which identifies where there is absence of communication between units. This information may be conveyed by the control frames described later.

Unit 0 in this example must perform a bypass operation because otherwise packets destined for Unit 3 could be caught in an endless loop. For example, if Unit 1 transmitted out of port C (or D) towards Unit 0 a packet that would normally have gone to Unit 2 and would normally 'hash' to port A or B, this packet would be received on port C or port D of Unit 0. If Unit 0 were in a normal operational mode it would perform a hash to decide which port should transmit the packet. If the packet were transmitted out of port A or B then the packet would return to Unit 1. Then this Unit 1 would retransmit to the packet to Unit 0, thereby forming an endless loop causing the packet to circulate continuously and never reach its proper destination.

As noted previously, powering-down of a unit is not the only cascade communication failure which can be 'healed'. If for example there is a link failure, which might even be an accidental removal of a cable, between two ports, a similar healing process can be executed. For example, suppose there is a link failure between cascade port A of Unit 2 and cascade port A of Unit 3. Then the packets which would normally leave cascade port A of Unit 2 in the Up direction can be looped-back to exit from port C or port D in the Down direction. In such a case both Unit 1 and Unit 0 need to be in the bypass mode so that the packets reach Unit 3 by way of the cascade ports C (or D) of Unit 1, Unit 0 and Unit 3.

(d) Cascade Status Information

The preferred cascade protocol requires that 32 bits of data be included with the frame as it is sent internally in the stack from one unit to another. These 32 bits of data are sent in a header at the start of the frame. Frames sent on the cascade may be sent with a 64 bit inter-packet-gap) to allow for this. The CRC of the frame may also cover the cascade header.

When a unit receives a packet, it will perform, if the packet is to egress from a port on the same unit, the usual packet processing functions, which need not be described here in detail. If the packet is to be sent on the cascade, it is provided with a header which includes certain information, called herein 'cascade information' that is used by a unit that receives the packet to determine (as will be described later), in conjunction with the setting of various registers, the appropriate processing for the packet received on the cascade. As will be explained later, the registers are controlled by means of control data sent around the cascade on a control path and are set in accordance with the numbering of the units, which of the units are active or not and other information to be outlined.

Figure 4:
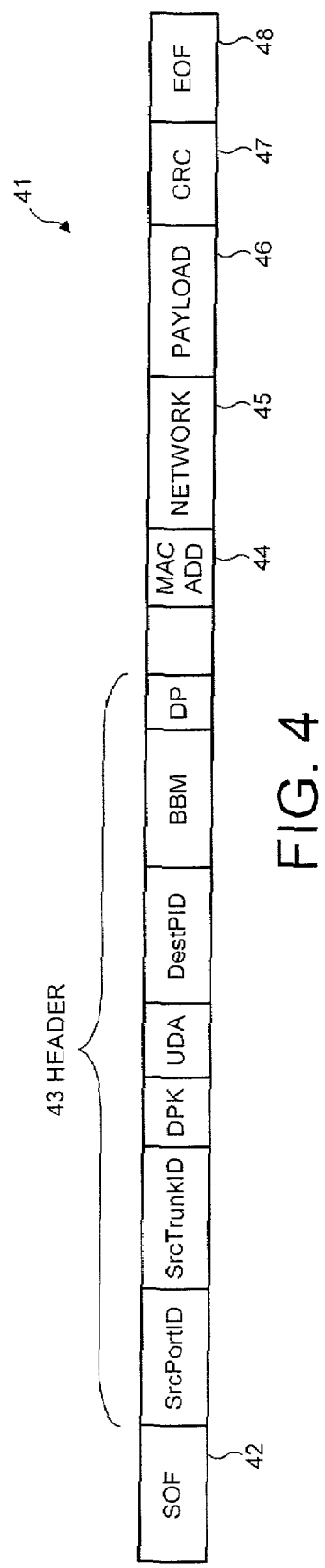
FIG. 4 illustrates a packet including cascade status information.

FIG. 4 illustrates in simplified form a packet 41 which is sent onto the cascade by a unit in accordance with the invention. The packet 41 has a start of frame (SOF) sequence 42, a 'cascade header' 43, a MAC address section 44, a network data section 45, a payload section 46, a CRC (cyclic redundancy code] section 47 and an end of frame (EOF) section 48.

The section 43 will be described below. It comprises the 32 bits of cascade information mentioned earlier. The information is inserted during the 'processing' of a packet by the switching engine.

The section between 43 and 44 may be occupied by some internal control sequence to delimit the start of the section 44, which is the layer 2 or MAC address section occupied by a destination address (DA) and a source address (SA). These are in conventional 48-bit form including the usual bits to indicate whether the packet is unicast, broadcast or multicast.

Section 45, entitled 'Network' is intended to signify network (IP) addresses. VLAN data and other parts which are of no great significance to the present invention.

Section 46, is the message part or payload of the packet, consisting of a multiplicity of bytes of user data.

Section 47 is the CRC or cyclic redundancy check portion which is normally (apart from the end of frame sequence 48) computed on all or part of the frame and is used to determine whether a frame has been received without error. The CRC may be (in known manner) computed for the packet including the header 43.

Cascade Header

The special 'cascade header' 43 for the present invention includes seven fields as explained below. Although it is particularly intended for use in the cascade system as described herein, the header format would have utility in other stack systems, as in for example that described in GB-2357390.

The first cascade header field (i), denoted 'SrcPortID[8:0], is the source port number in the stack that receives the frame.

This identification number and the destination port identification (DestPID) conform to a stack-wide format, wherein a portion of the identification number, and particularly the (least significant) bits [6:0] represents port numbering within a unit and another portion, particularly the (more significant) bits [8:7], represents the particular unit. Thus the cascade system or stack can in this example accommodate up to four units each having up to 128 ports. The format may be modified to accommodate more units. If eight units were the intended limit of the stack the 'UnitID' portion of the ID field could be augmented to three bits.

One advantage of such a format is that in most instances the source unit (which is he first unit in the stack to receive a packet from the external network) can perform a complete look-up for the destination port. Source port IDs for previously unknown addresses may be learnt in all the units to facilitate the performance of destination look-up in the source unit.

The second field in the cascade header is denoted SrcTrunkID[4:0]. This is the trunk number of the source port that receives the frame, if the source poi t be a member of a trunk.

This field is for the (known) purpose of identifying a trunk connection to a multiplicity of ports which may be distributed among the units in the stack, the trunk consisting of a multiplicity of essentially parallel links from those ports to a remote entity which may be a single switch but might be another stack of switches. The purpose of a trunk is to increase the bandwidth available for transmissions from one unit or entity to another. The connection of trunks to switches in a stack produces some complexity in the manner in which packets are forwarded on the cascade and although trunking and the difficulties of coping with it are not part of the present invention it needs to be said that the logic required for dealing with stack wide trunks preferably responds to an identification of a particular trunk so that units which receive packets by way of the cascade can determine whether such packets come from a trunk connection and, if so, which trunk connection. Examples of the handling of a stack wide trunk and the various modifications which need to be made to such rules as the 'same port discard' rule (in accordance with IEEE 802.1) are set out in published GB patent applications GB-2359692 and GB-2361830.

The third field in the cascade header is a one-bit field denoted 'DPK'. This is merely an acronym for 'destination port known'. If this bit in the header is set, the bit indicates that the destination port for the frame is also carried in the cascade status header (see below). This bit enables the forwarding of such a frame when it is received by the unit having that destination port, without another look-up.

The fourth field in the cascade header is a single bit field termed herein 'unknown DA' i.e. 'unknown destination address'. When this bit is set, it indicates that the destination MAC address (DA) in a packet received (by way of a front panel port) by a unit in the cascade is not found in the look-up database of that switch. Each unit in the stack will treat the destination address as an unknown entry. This applies to both unicast and multicast addresses.

The fifth field of the cascade header is the destination port identification 'DestPID[8:0]'. This field conforms to the format discussed in relation to the source identification and uniquely identifies a destination port and the relevant unit in the stack for the frame if the 'destination port known' field is se. If this latter field is cleared, the 'destination port ID' field is ignored.

Figure 5:
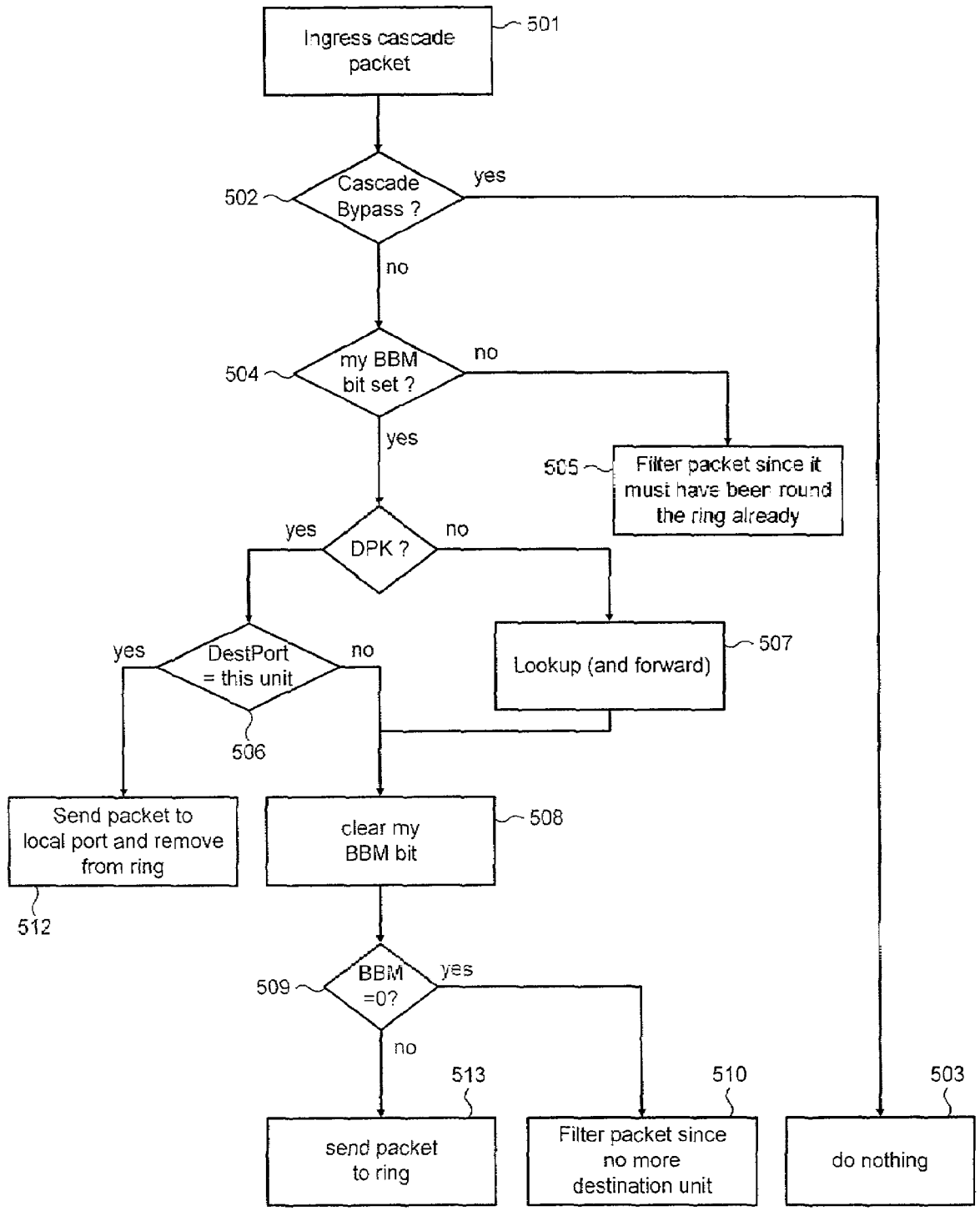
FIG. 5 illustrates a cascade algorithm.

The sixth field in the cascade header is the box bit mask field, BBM[3:0]. This field which is obtained as described hereinafter from a 'units present' register in a respective source unit, indicates by the setting of the respective bit the units which the relevant packet has already visited. Thus, if the bits indicate, from left to right, the Units 3 to 0 respectively, and the packet is received at Unit 1, then the box bit mask for the packet as it is put on the cascade by Unit 1 is 1101, that is to say all the units less the source unit. Unless an ingress port is in a bypass mode, as more particularly described later, a unit will, as part of the processing performed on the packet, clear the respective bit in the box bit mask. Reference is made below to FIG. 5 for a fuller description of how the box bit mask is handled.

The final field in the cascade header is a 'drop precedence' field constituted by a single bit. This bit is derived from the rules engine in the (source) unit in which the packet is first received. It is used at egress ports to determine the drop threshold for the egress or transmit queue. If the bit is set, the lower drop threshold is used to determine if the packet is to be added to the queue. Otherwise the 'queue full' threshold is used when adding the packet. In essence the drop precedence field may be employed to give certain packets a higher priority within the stack.

Box Bit Mask

FIG. 5 illustrates the manner in which the box bit mask field (BBM) is employed. This bit mask field does not affect the manner in which known unicast packets are normally handled. These packets, for which the destination port will be known, will be removed from the cascade ring by the destination unit. However, in the case of a change to the stack, for example reconfiguration which may cause the destination unit to be removed, the bit mask is required. It is also required to prevent recirculation of a packet.

As is shown in FIG. 5, the packet is received at a unit from the cascade. This is stage 501. Stage 502 is a test to determine whether the unit is in a cascade 'bypass' mode. If it is, then no processing is performed on the packet, as indicated by the 'do nothing' stage 503. The packet will be forwarded from the same port as received the packet, as described with reference to FIG. 3 and later with reference to FIG. 20.

Stage 504 is a test to determine whether the relevant box bit mask bit for the unit is set. If the bit is not set, then as shown by stage 505 the packet must be removed because it has traversed the ring already.

If the respective box bit mask bit is set, then a test (stage 506) for whether the destination port is known for the packet determines, if it be not known, a look-up (stage 507). If the destination look-up obtains a destination port on this unit, the packet will be forwarded from the respective local port. Otherwise the packet is destined for the cascade. If the destination port is known, there is a test, stage 511, to see whether the destination port is on this unit. This requires only a simple bit match rather then a full 'look-up'. If the destination port is on the respective unit, the packet is sent to the local port (stage 512) and removed from the ring. If the destination port is not on the respective unit, the box bit mask bit is cleared (stage 508). If the bit mask bits are all zero (stage 509), then the packet must be removed (stage 510) because there are no more destination units. If there is one or more set bits remaining in the box bit mask, the packet may be sent to the ring (stage 513).

Cascade Control Logic

The cascade which has been described in the foregoing requires in practice, in addition to the status information carried in the header of the packets, some control information which is passed between the units and which will enable them to be configured or reconfigured in a manner which will enable them to redirect packets and, in the case of a bypass' mode, to perform no redirection, in accordance with the status of the various units within the stack and particularly in respect of the 'self-healing' operation that has been described. Different forms of control may be employed but it is convenient and generally preferable to employ the control mechanisms described hereinafter. These control mechanisms are the subject of the aforementioned Donohue et al application of even date herewith but are described here in full in order to provide a (complete description of a cascade system.

The preferred form of cascade control is, as described in the following, an active system wherein in normal operation the units transmit various status parameters, which enable the units to compute their identification number (called herein 'unit ID'), to determine a list of units which are present in the cascade, and a list of which units are powered units within the cascade, and preferably also to inform the respective CPU of a variety of faults in the cascade. The preferred form of the cascade control is capable of performing self-healing in the event of removal of a unit or cable.

As described earlier, known cascade units which can tolerate hot insertion and removal, and provide a degree of self healing, employ T-pieces which can maintain a data path and a control path around the cascade notwithstanding the powering-down or removal of one of the units. It is advantageous in the context of the present invention to provide a control path which does not require connectors with internal multiplexers and which can provide for 'self-healing' in the event of removal of one of the units or cables in the cascade. The configuration employed for the control path is a chain of bi-directional, half duplex' links, each link extending from one unit to the next in a daisy chain of the units around the control path. On each link, in normal operation, the respective units will exchange information in a time shared manner. This information is preferably exchanged continually and is derived from registers within the cascade control logic in each unit.

Figure 6:
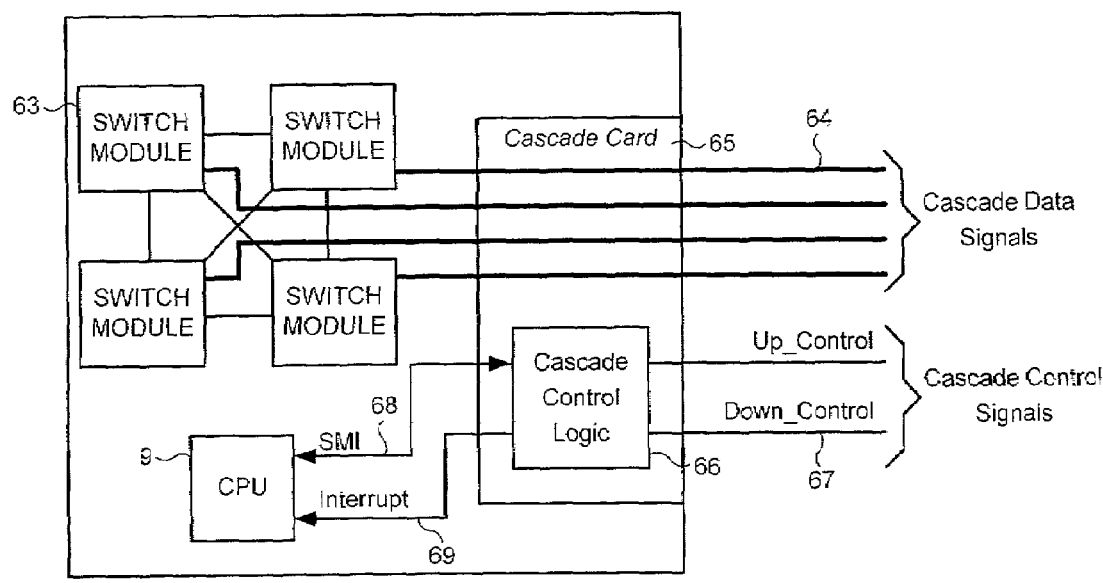
FIG. 6 illustrates schematically a cascade card in a switch.

FIG. 6 illustrates schematically the disposition of the cascade control logic within one of the switch units previously described.

The switch unit 61 shown in FIG. 6 operates in a manner similar to that functionally described with reference to FIG. 1. In this embodiment, it is physically organised somewhat differently to the apparent physical arrangement in FIG. 1, in that it is composed of a group 62 of four switch modules 63, each of which is a multiple port module. These switch modules communicate between themselves by means of high speed links in the manner described in, for example, the aforementioned copending application Ser. Nos. 09/645,569 and 09/818,670. However, the internal organisation of the switch module 62 is not particularly relevant to the present invention and it is sufficient to indicate that the modules operate as a single switch in respect of the combined set of ports that the modules have and are organised to forward onto the cascade or receive from the cascade packets on line 64 which are coupled to the four cascade ports previously described.

The cascade control logic is designed to monitor the cascade and to provide the following functions: (i) to provide the respective unit with a Unit ID; (ii) to provide the respective unit with a 'List of Units Present'; (iii) to provide the respective unit with a 'List of Powered Units'; and (iv) to inform the CPU of cascade faults The Cascade Control Logic (CCL) 66 may be implemented as an FPGA (field programmable gate array) that is accommodated on a cascade downlink card 65. The interface between the CCL 66 and CPU 9 is a Serial Management Interface (SMI) 68 as defined by IEEE 802.3-1998 Clause 22. The CPU is able to interrogate registers internal to the CCL. The registers contain information such as the Unit ID, the List of Active Units and the cascade link status. The CCL is able to inform the CPU of an urgent event via an interrupt signal 69.

The links 67 denoted $Up_{13}$ Control and Down_Control are bi-directional half-duplex serial links. The Up_Control signal path of a unit is connected to the Down_Control signal path of the next unit in the stack, in a daisy-chain fashion. Signalling on the bi-directional links is controlled by a master-slave relationship, the CCL generating the Up_Control signal being the master. Transmission of frames alternates between the master and slave, as described with reference to FIG. 9.

Figure 7:
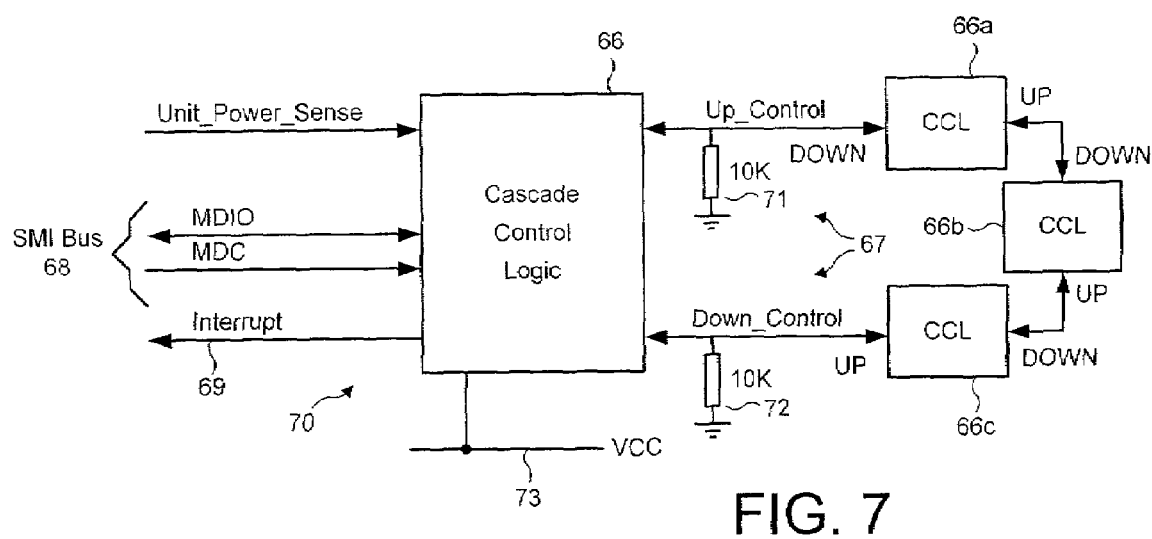
FIG. 7 is a schematic representation of cascade control logic.

As is particularly shown in FIG. 7, the cascade control logic 66 receives a signal, denoted 'Unit_Power_Sense' in accordance with the state of energisation of the particular unit. It exchanges information by way of the SMI Bus 68 with the central processing unit (CPU) and can provide interrupt signals on an interrupt line 69.

The cascade control logic 66 transmits control frames to, and receives control frames from, the cascade control logic 66*a* for the next unit by way of a line denoted 'Up_Control', which is a single line coupled to ground by a pull-down resistor 71. The cascade control logic 66 receives control frames from, and transmits control frames to, the cascade control logic 66*c* in the unit next below it by way of a Down_Control line having pull-down resistor 72. FIG. 7 shows the completion of the daisy chain by CCL 66*b* and 66*c*, each of the cascade control logic units (66-66*c*) being connected by way of its Up Control line to the Down_Control line of the control unit next 'above' it in the chain and also being connected by way of its 'Down_Control' line to the 'Up_Control' line of the cascade control logic in the unit next 'below it' in the chain.

The daisy-chain of bi-directional half-duplex links forms a complete ring. In normal operation this creates two virtual rings: one rotating clockwise and being the transmission direction for 'master' control frames, the other anti-clockwise, being the transmision direction for 'slave' control frames. If there is a break in the cascade wiring the control logic, and particularly its transport layer as described with reference to FIG. 10, can 'loop-back' frames. This allows the cascade control path to 'heal' in the same manner as the cascade data path.

The cascade control logic derives its power from a shared cascade VCC power line 73. This means that the CCL of a powered-off unit is still able to participate in Unit-ID numbering. The input Unit_Power_Sense indicates to the CCL whether the unit is powered up.

Although there is a variety of ways in which the units can be connected, it is convenient to employ between successive units a common cable which has a plurality of paths (in this example four) for data packets, a single control path and a single VCC line. The data paths may be twisted pairs or optical fibres. Each cascade port may have two multi-pin terminals, one each for the Up and Down directions.

Cascade Control Signals

Figure 8:
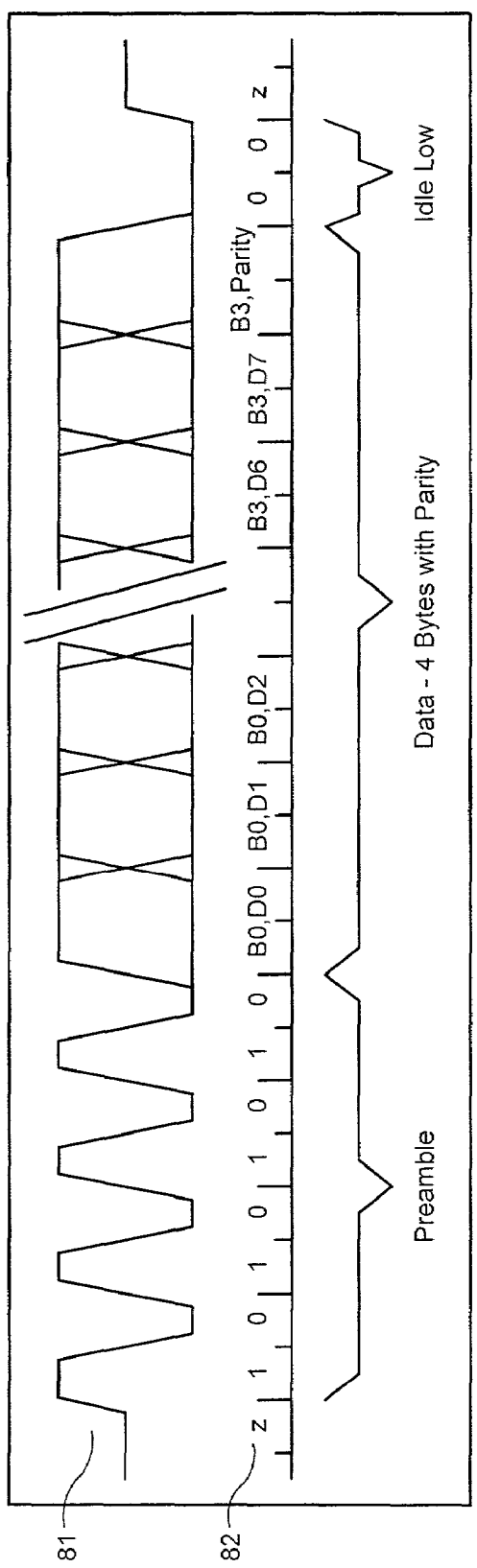
FIG. 8 illustrates a link layer frame format.
Figure 9:
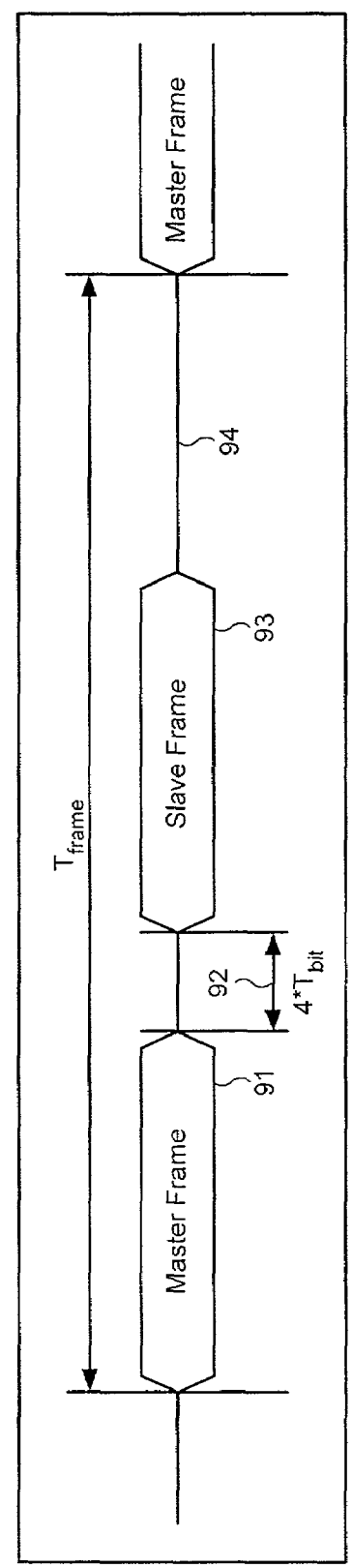
FIG. 9 illustrates frame traffic at a link layer.

The control frames shown in FIGS. 8 and 9 are transmitted and received by the link layers which will be described with reference to FIG. 10.

FIG. 8 illustrates at 81 the waveform of the cascade control signals and at 82 the significance of each of the parts of the waveform.

The preamble of each control frame consists of the sequence 10101010. The chips (channel bits) of the preamble are $T_{bit}/2$ (1 us) in length, half the length of the normal data bits. Hence the preamble constitutes a unique sequence not found in the control data. The preamble is followed by 4 data bytes (each with an odd parity bit). The data bits are $T_{bit}$ (2 us) in length. In FIG. 8, 'B0, D0' represents the first digit (bit) in the first byte and so on. The line is driven low for 2 us at the end of transmission, denoted by the 'Idle Low' (00) segment after which it is tri-stated (denoted by 'Z'). The duration of each frame is therefore 82 us.

Control data is transferred between units in a half-duplex fashion. The CCL is a 'master' on $Up_{13}$ Control and a 'slave' on Down_Control. The 'master' transmits a control frame (shown as the 'master frame' 91 in FIG. 9 every $T_{frame}$ (200 us). This is followed by an interval 92 of four times the bit period. Then the 'slave' transmits a control frame 93 after receiving the master's control frame. The end of the frame is defined as being the end of the 2 us 'idle low' interval. An idle interval 94 lasts until the end of the control cycle period ($T_{frame}$).

Control Link Layer

Figure 10:
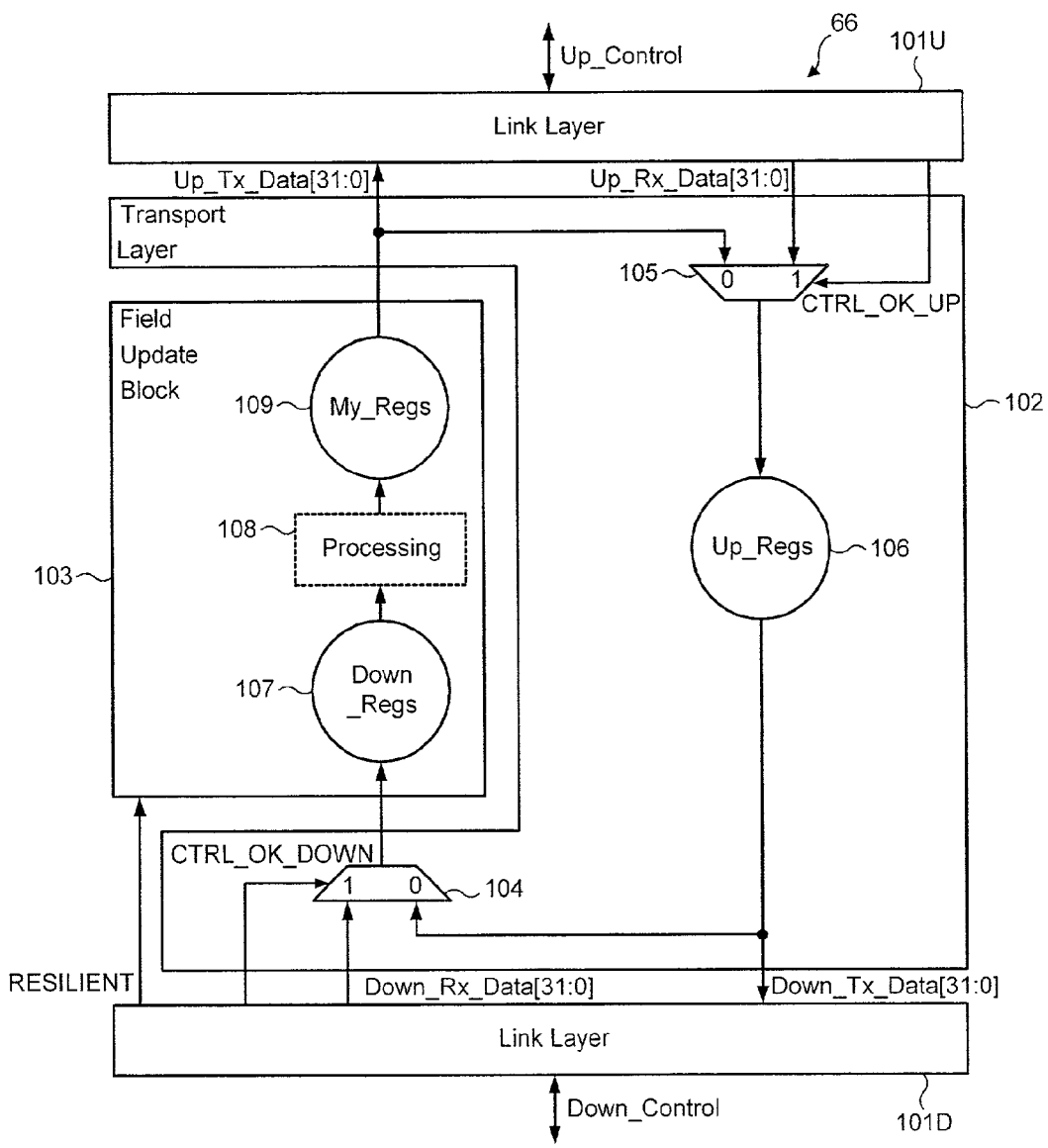
FIG. 10 illustrates logic blocks for cascade control logic.

FIG. 10 illustrates in more detail the cascade control logic 66. It broadly comprises two link layers, link layer 101U, connected to the unit's 'Up_Control' link and link layer 101D, connected to the unit's 'Down_Control' link. The link layers transmit and receive 4-byte control frames between the adjacent units. They also indicate, by responding to the presence or absence of valid control frames, the status of the Up_Control and Down control links by means of the signals CTRL_OK_UP and CTRL_OK_DOWN respectively. Link layer 101D indicates the idle state of the Down_Control link on a line denoted 'RESILIENT'.

Between the link layers is a transport layer 102 and a Field Update Block 103. The transport layer includes a first multiplexer 104 which is governed by the 'Control_OK-Down' signal. A second multiplexer 105 is controlled by the control OK-Up signal. Multiplexer 104 will pass either the Down Rx-Data obtained from the link layer 101D or the Down_Tx_Data which is supplied to the link layer 101D from a register set 106 denoted 'Up_Regs'. Multiplexer 105 will pass to the registers 106 either the Up_Rx_Data received from the link layer 101U or the Up_Tx_Data which is supplied to the link layer 101U from the Field Update Block. The Field Update Block receives the output of the multiplexer 104. It includes a register set 107 denoted 'Down_Regs', a processing function 108, and a register set 109 denoted 'My-Regs'. It provides an output by way of the transport layer 102 to an input of the multiplexer 105 and to the 'Up' link layer 101U. Thus Up_Tx_Data is supplied to the $Up_{13}$ Control and, controllably, to the register set 106.

The Transport Layer 102 provides the 4-byte data content of transmitted control frames. The Link Layer returns the data content of received frames to the transport layer. The Link Layer discards received frames that contain parity errors.

The link layer 101D reads the idle state of the Down_Control line $T_{bit}/2$ (1 us) after the 'idle low' following transmission of the slave frame. The result is output on RESILIENT (see FIG. 10). If a normal cable is attached to Down_Control the weak pull-down on the line will ensure that the RESILENT is low (i.e. denotes FALSE). A resilient cable differs from a normal cable in that it has a strong (1K) pull-up on its control signal lines. This pull-up will ensure that RESILIENT returns TRUE if a resilient cable is attached to Down_Control.

At time $T_{update}$ after reset and every $T_{update}$ thereafter CTRL_OK_UP and CTRL_OK_DOWN are evaluated. CTRL_OK_UP is set to TRUE if at least one frame has been received on Up_Control in the preceding $T_{update}$ (otherwise it is set to FALSE). Similarly, CTRL_OK_DOWN is set to TRUE if at least one frame has been received on Down_Control in the preceding $T_{update}$.

Cascade Control Transport Layer

The purpose of the transport layers is to circulate a 4 byte data field through the cascade control logic of all units of the stack. The data is first generated by the Field Update Block (FUB) of the 'bottom' stack unit and circulates through the FUB of each stack unit, eventually returning to the bottom unit. It is essential that the order of data circulation through the FUBs is preserved, regardless of whether the cascade control signal path is healed or not.

Under normal operation (CTRL OK_UP==TRUE and CTRL_OK_DOWN==TRUE) data from control frames received on Up_Control is written into the register set 'Up Regs' 106. The Up_Regs register set is used as the source of data for frames transmitted on the Down_Control line. Data from frames received on the Down_Control line is written into the Down_Regs register set 107. This data is parsed and modified by the processing function 108 FUB before being written to the 'My_Regs' 109 register set. This set 109 is used as the source of data for frames transmitted on the Up Control line.

If either of the signals CTRL_OK_UP and CTRL_OK_DOWN is FALSE then the control data paths are looped-back within the transport layer so as not to send the control data on the relevant control link. This effectively heals the control frame data path so that data always passes through the FUB of each unit in the same order. There is not necessarily a one-to-one relationship between frames received on Down_Control and those transmitted on Up_Control (and vice-versa) since each port may have different master clocks which may differ slightly in frequency.

Consider again the stack labelled 'Normal Operation' in FIG. 2. Data generated by the FUB in Unit-0 will circulate (in a clockwise direction) through the FUB in Unit-1, Unit-2, Unit-3 and will then received by Unit-0 on Down_Control. Data will also circulate anti-clockwise through the Up_Regs in each unit. Since this data is not processed by the FUB it is meaningless. If the cable between Unit-1 and Unit-2 is disconnected, data generated by the FUB in Unit-0 will be written into the FUB of Unit-1. Since CTRL_OK_UP in Unit-1 is FALSE, the FUB data output (Up_Tx_Data) is looped-back (via Up_Regs) and sent out on Down_Control. This data is received on Up_Control on Unit-0 and is written into Up_Regs. The data is then re-sent out on Down_Control and is received by Up Control on Unit-3. Unit-3 also transmits the data out of Down_Control without processing it. Unit-2 receives the data on Up Control. Since CTRL_OK_DOWN on Unit-2 is FALSE, this data is looped-back into the FUB (via Up_Regs). The FUB processes the data and sends it out of Up_Control. The data is processed by the FUB in Unit-3 and is then sent out of Up_Control to Unit-0. The path of the data through the FUBs is Unit-0, Unit-1, Unit-2, Unit-3 and then back to Unit-0 as in normal operation.

Control Frame Data

Figure 11:
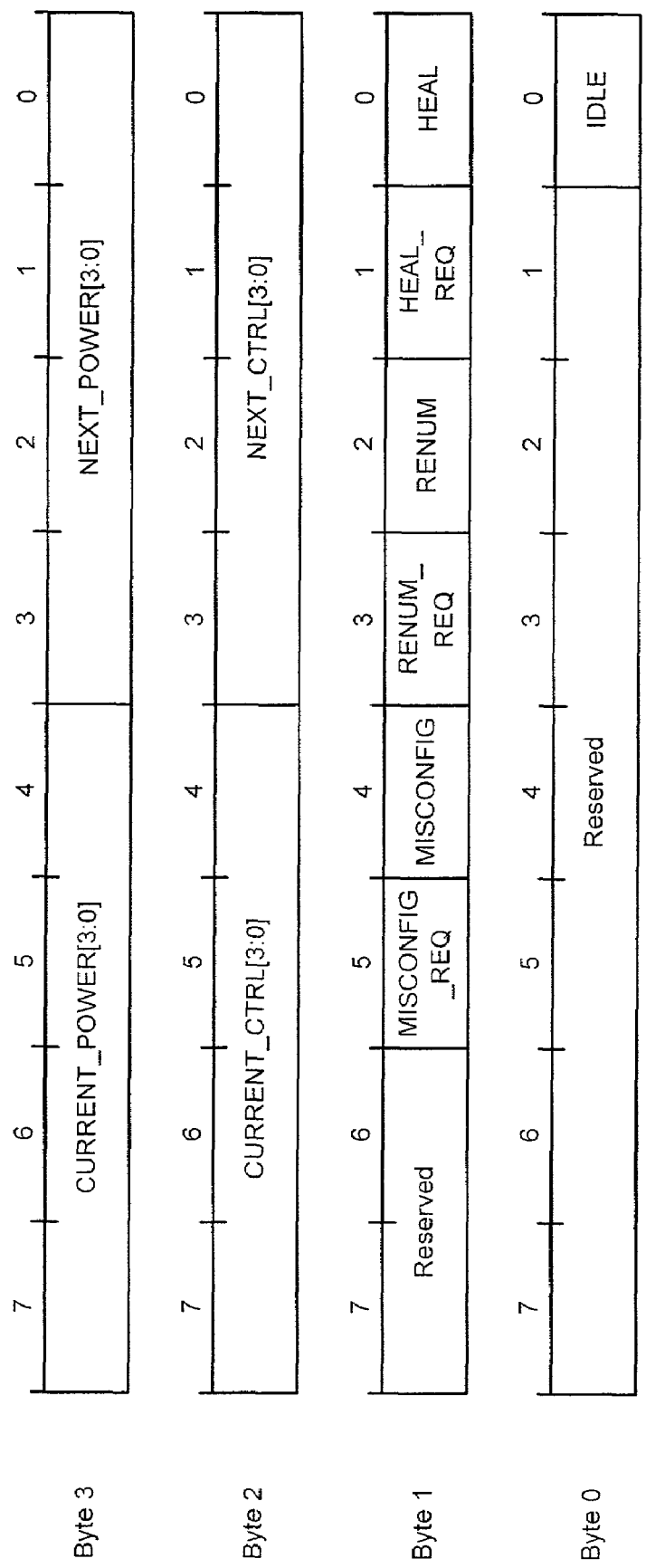
FIG. 11 illustrates control frame data.

The control frame data transmitted and received by the FUB 103 has the format shown in FIG. 11. An 'idle' frame has IDLE set to '1'. This indicates that only the first byte of the frame data is valid. 'Active' frames have IDLE set to '0' and all the frame data is valid. HEAL_REQ and HEAL are used to indicate that the cascade data path must be healed by the CPU. RENUM_REQ and RENUM force the FUB to renumber all units in the stack. MISCONFIG_REQ and MISCONFIG are used to signal a cascade cabling misconfiguration. CURRENT_CTRL is a list (in the form of a bit mask) of all units present in the stack; NEXT_CTRL is a temporary variable used in its calculation. CURRENT_POWER is a list (bit mask) of all units that are powered-up; NEXT_POWER is a temporary variable used in its calculation.

Primary & Secondary Status

The FUB 103 must decide whether the unit is a 'primary' or a 'secondary' unit. There should only be one primary unit in a stack and it processes control data in a different manner than secondary units. The primary unit initiates the transmission of 'active' control frames around the stack. If a primary unit does not initiate the transmission of active frames then secondary units will transmit 'idle' frames.

Figure 12:
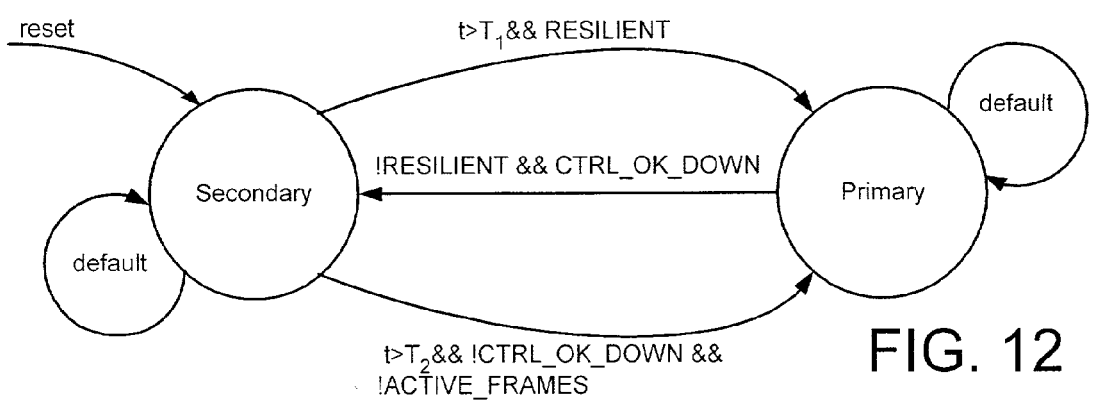
FIG. 12 is a state diagram.

FIG. 12 shows how the FUB evaluates whether the respective unit is a primary or secondary unit. The signal ACTIVE_FRAMES is a signal internal to the FUB that is evaluated every $T_{update}$. ACTIVE_FRAMES is set to TRUE if active frame data has been received by FUB at least once in the preceding $T_{update}$ (otherwise it is set to FALSE).

If there is a resilient cable plugged into the unit's Down_Control then RESILENT==TRUE and the unit becomes a primary (at time $T_1$ after reset).

If there is no resilient cable between top and bottom units, a unit will not receive any active frames and it will become (at time $T_2$ or later) the primary if Down_Control is not connected to another unit (CTRL_OK_DOWN==FALSE).

If the resilient cable is replaced with a normal cable (i.e. all cascade cables are normal cables), there will be no unit with CTRL_OK_DOWN==FALSE and all units will remain secondary units. If the FUB of a secondary unit has received no active frames by time $T_3$ then it will set the MISCONFIG_REQ bit in its SMI register. The change in state of the SMI register MISCONFIG_REQ will also cause an interrupt to alert the CPU to the error condition.

If there is more than one resilient cable in the stack, most, but not all error conditions could be detected if the presence of a resilient cable on both Up_Control and Down_Control were checked. This mechanism fails in the case of a four-high stack with resilient cables between the top and bottom units and between the middle two units. The CPU can detect this combination and all others so it is preferable to leave checking for two resilient cables as a CPU task. For example, a stack management agent (SMA) in a primary unit could broadcast a special packet containing the unit's MAC address. If a primary unit's SMA received such a packet with an IP address not its own, then it would know that there are more than two primary units in the stack.

Unit-ID Numbers

The purposes of unit numbering are listed below in descending order of priority. The order of priority means that it is more important that units have ascending numbers than that they retain their existing Unit-ID. So, if a unit is added to the bottom of a stack it is likely that units above it will need renumbering.

Each stack unit has a unique Unit-ID. It is desirable to provide newly powered-up units with a sequential Unit-ID (so that Unit-IDs increase in an ascending order from Unit-0 at the bottom of the stack). Jumps in the ascending order of unit numbers are acceptable.

Existing powered-up units retain their Unit-ID (provided this does not lead to non-sequential unit numbers). This minimises modification of lookup tables.

The algorithm that achieves these goals is expressed in Verilog code in FIG. 13. In FIG. 13 'My_regs_UNIT_ID' refers to the parameter UNIT_ID in the 'My_Regs' registers. Similarly 'down_regs_IDLE' refers to the parameter IDLE in the 'Down_Regs' registers. The algorithm also deals with the error condition of the FUB receiving a frame with Unit-ID=3. This could occur in a four-unit stack where the bottom three units had Unit-IDs 0, 1 and 3. The fourth unit will transmit frames with RENUM_REQ set. The primary unit will receive this and transmit frames with RENUM set, causing all units in the stack to renumber to sequential Unit-IDs. The algorithm also checks for the condition of more than four units in the stack—in which case the fifth unit transmits frames with MISCONFIG_REQ set. The primary unit will copy this bit into the MISCONFIG bit of its frames, ensuring that all units are aware of the stack mis-configuration.

List of Powered Units and List of Units Present

A list (bit mask) of powered units (CURRENT_POWER [3:0]) is needed for the following reasons:

(a) To allow the CPU to purge the lookup table of entries relating to a non-powered unit.

(b) To allow the CPU to configure the switch so that only packets destined for a powered unit are forwarded on the cascade.

The list of units present (CURRENT_CTRL[3:0]) is the list of units participating in the control signal path. Since the cascade powers the CCL, the list of units present will also include units that are powered-off. This list is necessary to detect the condition of more than four units in a stack.

CURRENT_POWER[3:0] and CURRENT_CTRL[3:0] are compiled using the algorithm in FIG. 14. The algorithm makes use of the temporary variables NEXT_POWER[3:0] and NEXT_CTRL[3:0]. The primary unit initialises NEXT_POWER and NEXT_CTRL setting only the bit corresponding to its Unit-ID. Secondary units receiving this data set their bits within these fields. When this data returns to the primary unit NEXT_POWER and NEXT_CTRL form a complete list of the powered units and units present. The primary unit copies these fields across into CURRENT_POWER and CURRENT_CTRL.

The CPU is able to access the latest version of CURRENT_POWER via an SMI-bus accessible register. This information is used as a forwarding-mask for the switches such that only packets destined for active units are forwarded in the cascade data path.

Request Data Path Healing

All units in a stack will take action to heal the data path. If the reason for data path healing is a powered-down unit then all units will be aware of this since CURRENT_POWER and CURRENT_CTRL will differ. In the case of a missing cascade cable, the problem will be visible to adjacent units since either CTRL_OK_UP or CTRL_OK_DOWN will be set to FALSE. The FUB in these units should set the bit HEAL_REQ in active frames that they transmit. The FUB in the primary unit will copy this bit to HEAL, ensuring that all units are aware of the need to heal the cascade data path.

Interrupts

The Interrupt line to the CPU is asserted whenever one of the following SMI register values change: CURRENT_POWER, UNIT_ID, RENUM, MISCONFIG_REQ, MISCONFIG or HEAL. The interrupt stays asserted until reset by writing to a SMI register. Interrupts are initially disabled at power-up and are enabled by writing to a SMI register.

Time Sequence after Power-Up or Reset

In a first phase, 0 to $T_1$, the Link Layer will transmit and receive frames between adjacent units. Since there is no primary, these will be idle frames. The Link Layer will evaluate CTRL_OK_UP and CTRL_OK_DOWN every $T_{update}$. The Transport Layer will loop-back the control data path if necessary $T_1$ is approximately 10 ms—enough time for the Link Layers to send out frames and the Transport Layer to have healed the control data path (by performing any necessary loop-backs).

In a second phase, $T_1$ to $T_2$, the FUB in each unit will determine primary or secondary status. If there is a resilient cable within the stack then the primary will begin to transmit active frames and unit numbering will proceed. Complete control frame data will be computed within 2 ms. This is the time taken for control data to circulate twice around the stack. [It takes 82 us for Unit-0 to transmit a frame to Unit-1. It takes up to 282 us ($T_{frame}$+duration of frame) to transmit a frame with this data from Unit-1 to Unit-2 (since Unit-2 may have just started transmitting a frame with old data). It also takes up to 282 us to transmit a frame with this data from Unit-2 to Unit-3 and from Unit-3 to Unit-0. The total time to circulate control data around a stack is thus $3*T_{frame}+4*$(duration of frame)=928 us. Time $T_2$ is approximately 100 ms—enough time for the active frames to have reached all units, if there is a primary present.

If a third phase, T2 to T3 is reached, no active frames are being received, the FUB in each unit will re-evaluate primary and secondary status. If there is a unit will CTRL_OK_DOWN==FALSE then it will become the primary and it will begin to transmit active frames. Unit numbering will proceed and complete control frame data will be computed within 2 ms. $T_3$ is approximately 200 ms—enough time for the active frames to have reached all units, if there is a primary present. If no primary is present, there must be a stack-cabling mis-configuration.

CCL Operation ExamplesConsider the stack of four units labelled as 'Normal Operation' in FIG. 2. Assume that the units are first powered up simultaneously. The Link Layers in each unit will exchange idle frames every $T_{frame}$. At time $T_{update}$ CTRL_OK_UP, CTRL_OK_DOWN will be evaluated as TRUE. As a result the Transport Layers in each unit's CCL will set up the control data paths without loop-back.

At time $T_1$ the FUB in each unit will evaluate its primary/secondary status. The bottom unit will become a primary and Unit-0 (since it has a resilient cable connected to Down_Control). The FUBs in other units will identify themselves as secondary units. The primary unit will start to transmit active frames on its Up_Control line containing Unit-ID=0, the signal CURRENT_POWER=4'b0000, the signal NEXT_POWER=4'b0001, CURRENT_CTRL=4'b0000 and NEXT_CTRL=4'b0001. The next unit up the stack will receive these values as part of frames on Down_Control. It set its Unit-ID=1, NEXT_POWER=4'b0011 and NEXT_CTRL=4'b0011 (in My_Regs) and will transmit frames with this data on Up_Control. The data will progress up the stack with the next units taking Unit-ID's 2 and 3. When the bottom unit (Unit-0) receives frames containing this data on Down_Control, it will copy NEXT POWER (4'b1111) to CURRENT_POWER and NEXT_CTRL (4'b1111) to CURRENT_CTRL indicating 4 powered-up units in the stack.

To provide an example of an operational failure, suppose that a network engineer trips over a power cable and powers-down Unit-2. This is the configuration shown as 'Healed Ring' in FIG. 3. Since the CCL logic is powered by the cascade the control signal path is unaffected and control frames continue to circulate. However the Unit_Power_Sense line on the input to the CCL on Unit-2 will go low. The FUB in Unit-2 will set its bit in NEXT_POWER to '0'. The frame field CURRENT_POWER will change in all units to 4'b1011, indicating the lack of power to Unit-2. The CCL in all units will assert Interrupt to indicate the change in the cascade status. Units 1 and 3 will heal the cascade data path by looping-back the cascade data path. All units will update their forwarding tables to remove entries for Unit-2. The use of CURRENT_POWER to mask transmission of frames onto the cascade will quickly remove cascade packets destined for Unit-2.

The network engineer will eventually notice the problem and will plug the power cable back into Unit-2. The CCL all units will identify that Up_Control and Down_Control are now active and that power has been returned to Unit-2. CURRENT_POWER will be changed to 4'b1111 and CURRENT_CTRL to 4'b1111. The CCLs on all units will interrupt their CPU to alert them to re-read the CCL registers and update their forwarding tables. The state of the stack will quickly be healed into the topology labelled 'Normal Operation' in FIG. 2.

Timing Intervals

Table 1 is a summary of the timing periods employed in the preferred embodiment.

TABLE 1

| Symbol | Description | Value | Units |
|---|---|---|---|
| $T_{bit}$ | Control frame bit period. | 2 | us |
| $T_{frame}$ | Time between start of transmission of each master control frame. | 200 | us |
| $T_{update}$ | Time between updates of CTRL_OK_UP, CTRL_OK_DOWN, and ACTIVE_FRAMES. | 1 | ms |
| $T_1$ | Time after reset at which FUB evaluates primary status based on presence of resilience cable. | 10 | ms |
| $T_2$ | Time after reset at which FUB evaluates primary status based on CTRL_OK_DOWN and absence of active frames. | 100 | ms |
| $T_3$ | Time after reset at which FUB evaluates a stack-cabling mis-configuration based on the absence of active frames. | 200 | ms |

Control Logic Registers

Figure 17:
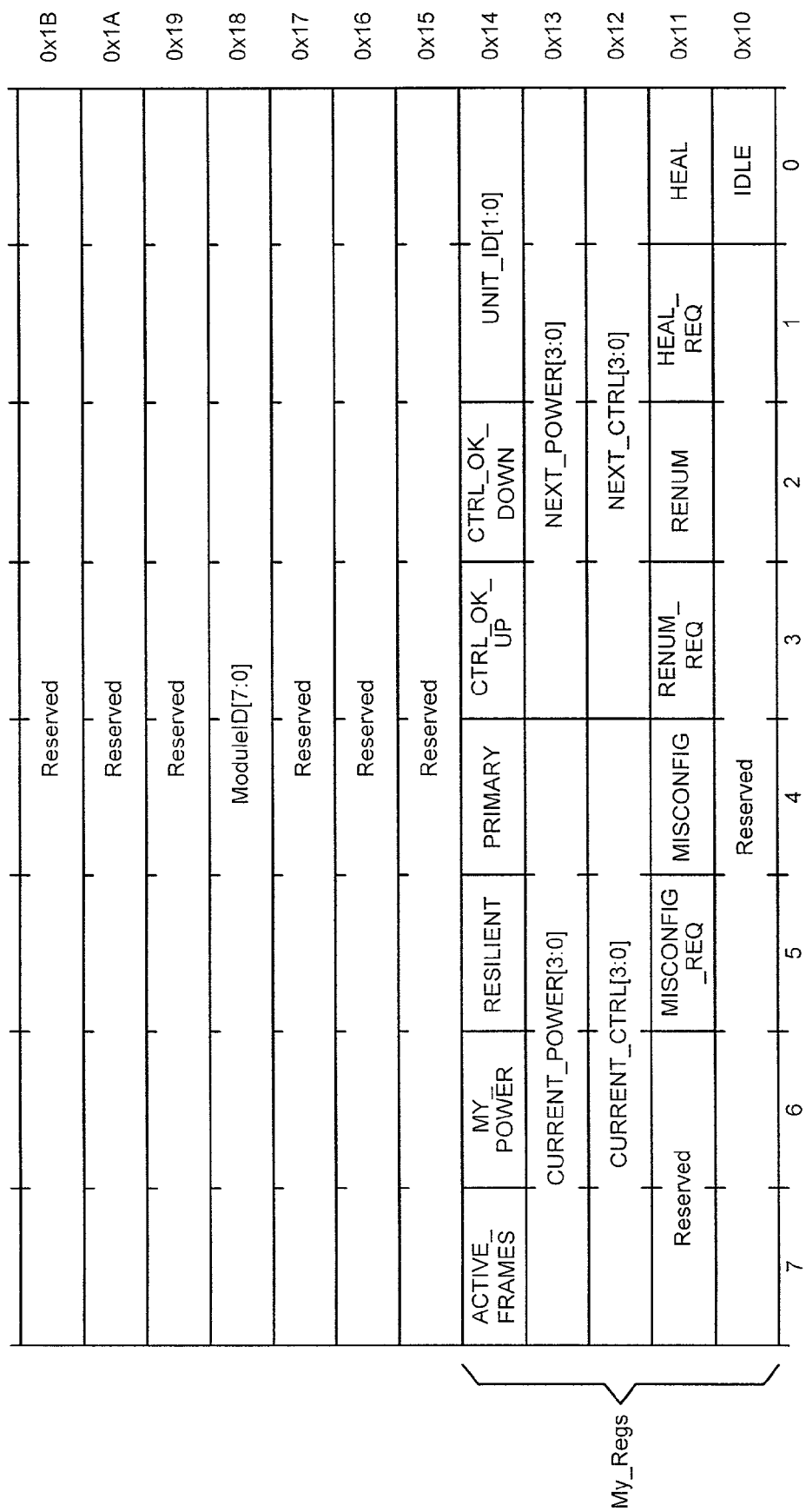
FIG. 17 illustrates another register format.

FIGS. 15 to 17 illustrate the allocation of space in each of the registers in the cascade control logic.

FIG. 15 shows the register format for the 'Up_Regs' and 'Down_Regs'. Each of these registers is a four byte register. Bit 0 of byte 0 if set indicates an idle state. The second byte, byte 1, has bytes indicating healing, a heal request, renumbering, a renumbering request, a misconfiguration and a misconfiguration request. Bits 7 and 8 are reserved. The first 4 bits of byte 2 comprises a four bit word indicating the next control. Bytes 4 to 7 of the second byte is a four bit word indicating a current control. The last byte, byte 3, is composed of two 4 byte words denoting 'next power' and 'current power'.

FIG. 16 illustrates the register format for 'My_Regs' in the cascade control logic. This is similar to the format described in FIG. 15 but the register has an additional byte of which the bytes 0 and 1 denote the unit identification, bit 2 indicates 'CTRL_OK_DOWN', bit 3 denotes 'CTRL_OK_UP', bit 4 denotes 'primary', bit 5 denotes 'resilience', bit 6 denotes 'My_Power' and bit 7 denotes 'Active_Frames'.

FIG. 17 illustrates the registers in the SMI memory map. The first five bytes correspond to the contents of the register described in FIG. 16. The ninth byte indicates the module identification number. The bits in the other bytes are reserved.

Cascade Operation

Figure 18:
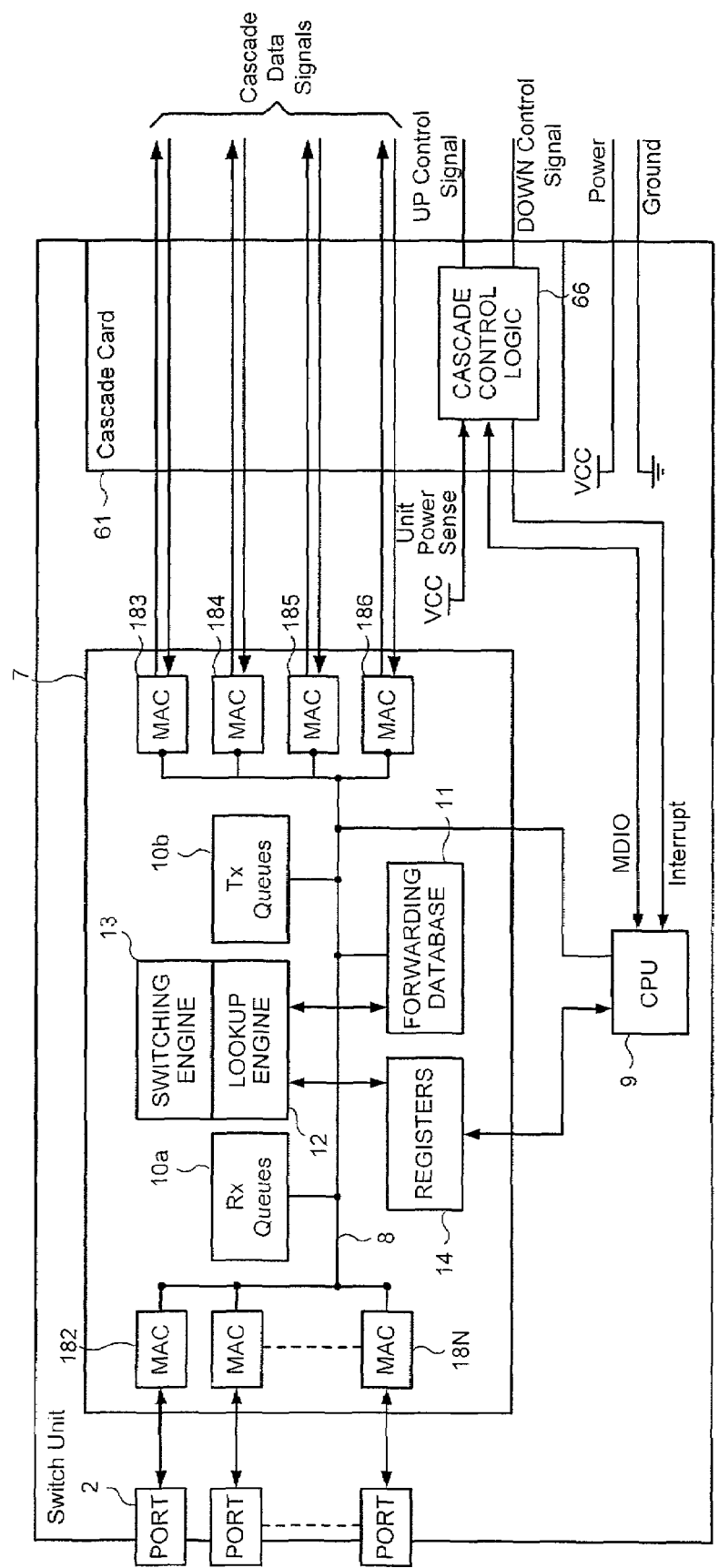
FIG. 18 illustrates a switch unit in accordance with the invention.

The following description provides examples of the usage of the cascade status information in the operation of the cascade shown in FIGS. 2 and 3. It also shows how the cascade control logic detects and distinguishes between the various kinds of operational failure and how theat logic and in particular the registers constitute with the CPU a means of responding to the status information represented by the control frames (or their absence) to control the switching engine. FIG. 18 shows a simplified view (based on FIG. 1) of the switch architecture. The four switch ASICs 63 of FIG. 6 have been represented as one block (as in FIG. 1) and their internal architecture simplified.

FIG. 18, shows within the ASIC 7 a bus system 8, a forwarding database 11, a look-up engine 12, a switching engine 13 and registers 14 as previously described with reference to FIG. 1. The memory space is shown in two parts for convenience. Part 10*a*, denoted 'Rx Queues' stores received packets whereas part 10*b*, denoted 'Tx Queues' stores packets which are ready for transmission from respective ports. FIG. 18 also shows media access controllers (MACs) which receive packets from and send packets to the physical ports. The MACs 182 . . . 18N on the left are each associated with a respective one of the 'front panel' ports 2 . . . N whereas the MACs 183, 184, 185 and 186 are each associated with a respective one of the 'cascade' ports 3 to 6. Each MAC 183-186 receives data signals (packets) from and sends such signals to the respective port and thereby forms a respective MAC domain with the MAC at the other end of the link to which the respective port is connected.

The CPU 9 is shown for convenience separate from the ASIC 7. It is coupled to the cascade control logic 66 in the manner described with reference to FIG. 6.

FIGS. 19) and 20 illustrate the CCL register fields in normal operation (as in FIG. 2) and in self-healing operations (FIG. 3).

The Cascade in Normal Operation

When a packet is received on one of the front ports 2 to N shown on the left-hand side of FIG. 18, the packet passes through the MAC and is temporarily stored in the 'Rx Queues' portion of the memory. The switching engine 13 will read the layer-2 source and destination address from the header of the packet. The look-up engine 12 will (with recourse to database 11) determine the destination port of the packet. If the packet is destined for another front-panel port it will be forwarded to the Tx Queue associated with that port. If the look-up engine 12 determines that the packet is destined for the cascade then it will be forwarded to the Tx Queue of one of the cascade ports. The cascade is a trunk of four ports so a hash is first computed (based typically on the Layer-2 or Layer-3 source and destination addresses) which determines which of the four ports will transmit the packet. Packets in the Tx Queues are transmitted on the ports on a first-in, first-out basis.

The CPU 9 is able to determine the status of the stack by reading registers within the Cascade Control Logic (CCL). In general it will need to do this once soon after power-up. The CPU does not need to periodically examine the CCL registers since the CCL will interrupt the CPU in the event of a change in stack status.

As may be seen in FIG. 19, in normal operation the 'CURRENT_POWER', 'CURRENT CTRL' fields are all '1' and the CTRL_OK UP and CTRL OK_DOWN fields are each '1', whereas the 'HEAL' field is '0'.

Cascade Operation in the Transition from Normal to Healed Mode

Now consider that the power for Unit-2 is removed. The CCL signalling mechanism described with reference to FIGS. 6 to 16 will quickly (within approximately 2 ms) update the CCL register fields within each unit. The change in value of CURRENT_POWER will cause the CCL in each unit to interrupt the CPU. The CCL register fields will have the values shown in FIG. 20.

The CPU in Unit-2 will take no action since it will be powered-off. The CPUs in units 0, 1 and 3 will respond to the interrupt by reading the CCL registers. Since CURRENT_CTRL=4'b1111 and CURRENT_POWER=4'b1011, the CPUs will conclude that Unit-2 is powered-down and the cascade must be healed. In this example, since HEAL=0 there are no 'missing-cable' failures within the cascade.

The CPU in Unit-0 will note (from the CURRENT_POWER field) that it is not adjacent to the powered-down unit and so has sufficient information to put its data-path in the 'bypass' mode. The CPU achieves this by enabling a special mode within the Switching Engine. Any packets received on ports C and D (the right-most ports in FIG. 3) of the cascade must re-transmitted on those ports without lookup. The CPU also adjusts the cascade hashing-algorithm such that cascade packets (other than those received on ports C and D of the cascade) are only transmitted on ports A and B. The CPU controls the Switching Engine modes and cascade hashing-algorithm by writing to control registers within the switch ASIC.

The CPU in Unit-1 will note that it is adjacent to the powered-down unit and must heal the cascade by looping-back the data-path. The CPU achieves loop-back by adjusting the cascade hashing-algorithm such that packets are only transmitted on ports C and D (the right-most ones in FIG. 3).

The CPU in Unit-3 will note that it is adjacent to the powered-down unit and must heal the cascade by looping-back the data-path. The CPU adjusts the cascade hashing-algorithm such that packets are only transmitted on ports A and B. The CPUs in each of units 0, 1 and 3 will also perform the following tasks:

(a) The CPU will set a switching engine control-register such that the Box Bit Mask of transmitted (or re-transmitted) packets does not discarded, as indicated in FIG. 5. This will quickly purge the cascade of packets destined only for Unit-2.

(b) The CPU will purge the Forwarding Database of entries relating to Unit-2.

The cascade is now in Healed Mode as illustrated by the 'Healed Ring' in FIG. 3.

Cascade Operation in Healed Mode

In this mode, packet forwarding occurs normally, subject to the cascade loop-back and bypass operation that are enabled in the 'Healed Mode'.

Cascade Operation in the Transition from Healed to Normal Mode

Consider the stack of switch units in FIG. 3. The CCLs in each unit will have the register fields shown in FIG. 20. Now consider that the power for Unit-2 is reconnected and the unit powers-up. The CCL signalling mechanism will quickly (within approximately 2 ms) update the CCL register fields within each unit. The change in value of CURRENT_POWER will cause the CCL in each unit to interrupt the CPU. The CCL register fields will have the values shown in FIG. 19. The CPUs in all units will respond to the interrupt by reading the CCL registers. The interrupt response time of the CPU in Unit-2 is likely to be slower (due a delay caused by the power-up sequence) than that of units 0, 1 and 3. Since both CURRENT_CTRL and CURRENT_POWER equal 4'b1111 all CPUs will conclude that there are four units in the cascade and they are all powered up. Since HEAL=0 the CPUs will also conclude that there are no "missing-cable" failures within the cascade. The CPU in Unit-0 will disable the by-pass mode of the data-path. The CPU will also adjust the cascade hashing-algorithm such that cascade packets are transmitted on all four cascade ports (A, B, C and D).

The CPU in units 1 and 3 change their cascade hashing-algorithm such that cascade packets are transmitted on all four cascade ports (A, B, C and D). This will effectively disable the data-path loop-back.

The CPU in Unit-2 will set its cascade hashing-algorithm such that cascade packets are transmitted on all four cascade ports (A, B, C and D). The data-path by-pass mode will remain disabled (the default configuration).

Since Units 0, 1 and 3 respond to the CCL interrupt much more quickly than Unit-2 it is possible that these units will heal the data-path (to include Unit-2) before Unit-2 is able to switch packets. This could result in the loss of cascade packets for a short period of time. It may be advantageous to delay the healing of the data-path until Unit-2 is fully functioning.

The CPUs in all units 0, 1 and 3 also perform the following tasks:
(a) The CPU must set a switching engine control-register such that the Box Bit Mask of transmitted (or re-transmitted) packets allows bits to b (set for all powered-up units (including Unit-2).
(b) The CPU must permit the learning of address associated with Unit-2.

The cascade is now in Normal Mode as illustrated by the stack labelled 'Normal Operation' in FIG. 2.

Cascade Operation in the Transition from Normal to Healed Mode (Due to Missing Cable)

Consider the stack of switch units in FIG. 2 labelled 'Normal Operation. The CCLs in each unit will have the register fields shown in FIG. 19.

Now consider that the cable between Unit-1 and Unit-2 is removed. The CCL signalling mechanism will quickly (within approximately 2 ms) update the CCL register fields within each unit. The CCL register fields will have the values shown in FIG. 21. The change in the value of HEAL will cause the CCL in each unit to interrupt the CPU.

The CPUs in all units will respond to the interrupt by reading the CCL registers. Since CURRENT_CTRL=4'b1111, CURRENT_POWER=4'b1111 and HEAL=1, the CPUs will conclude that the failure is due to a missing cable.

The CPUs in Unit-0 and Unit-3 will note that they are not adjacent to the missing cable (since their CTRL_OK_UP and CTRL_OK_DOWN are both 1). The data paths of units 0 and 3 will be placed in bypass mode. The CPU achieves this by enabling a special mode within the switching engine. Any packets received on ports C and D (the right-most ports in FIG. 2) of the cascade must re-transmitted on those ports without lookup. The CPU also adjusts the cascade hashing-algorithm such that cascade packets (other than those received on ports C and D of the cascade) are only transmitted on ports A and B. The CPU controls the switching engine modes and cascade hashing-algorithm by writing to control registers within the switch ASIC.

The CPU in Unit-1 will note that it is adjacent to the missing cable (since CTRL_OK_UP=0) and it must heal the cascade by looping back the data path. The CPU achieves loop-back by adjusting the cascade hashing-algorithm such that packets are transmitted only on ports C and D (the right-most ones in FIG. 2).

The CPU in Unit-2 will note that it is adjacent to the missing cable (since CTRL_OK_DOWN=0) and it will heal the cascade by looping back the data path. The CPU achieves loop-back by adjusting the cascade hashing-algorithm such that packets are transmitted only on ports A and B. The cascade is now in Healed Mode.

The invention claimed is:

1. A network unit which is capable of use in a cascaded stack of network units and includes:
   a multipicity of ports for receiving and forwarding addressed data packets,
   a switching engine for directing received packets to at least one port in accordance with address data in the packets;
   at least two cascade ports for receiving packets from and sending packets to adjacent network units in the cascaded stack;
   means for detecting an operational failure between this network unit and an adjacent network unit in the stack and for controlling the switching engine to redirect packets which would otherwise be sent from a particular port to that adjacent network unit to be forwarded from another port whereby to be sent to a different network unit in the stack; and
   wherein this network unit is responsive to control data indicating an operational failure between two other units in a stack to enter a bypass mode to cause packets received at a cascade port and intended for further transmission on the cascade to be forwarded without being re-directed by the switching engine.

2. A network unit according to claim 1 wherein the unit has at least one cascade pod for reception and forwarding of packets in a first direction around the cascade and at least one cascade port for reception and forwarding of packets in a second direction around the cascade.

3. A network unit according to claim 2 and having at least two cascade ports for each of the first and second directions.

4. A network unit according to claim 1 wherein the unit includes control logic for forwarding control frames to and receiving control frames from one each of two control paths and for thereby determining the operational status of other network units so as to control said switching engine.

5. A network unit according to claim 4 wherein the control logic detects said operational failure.

6. A network unit according to claim 1 and operative to provide for each packet that is forwarded from a cascade port a header which includes a destination port field that identifies a destination port and the network unit on which that destination port is located.

7. A network unit according to claim 6 wherein the header includes a field that indicates the validity of the destination port field.

8. A network unit according to claim 4 wherein the said header includes a source port field which identifies a source port by which the packet has been received and the network unit on which that source port is located.

9. A network unit according to claim 1 wherein the unit provides for each packet that it forwards from a cascade port a header portion which network units in a stack have and have not been traversed by the packet.

10. A network unit according to claim 9 wherein said header portion is a bit mask.

11. A network unit according to claim 9 wherein the unit responds to said header portion to discard the packet if said header portion indicates that the packet has already traversed the unit.

12. A network unit according to claim 9 wherein the unit responds to said header portion and to an indication that a destination port for the packet is known to determine whether the destination port is on the unit and the unit responds to said header portion and to an indication that a destination port is unknown to perform a look-up in an address database for the destination port.

* * * * *